United States Patent
Thiyagarajan et al.

(10) Patent No.: US 11,995,081 B2
(45) Date of Patent: May 28, 2024

(54) PREDICTING FUTURE QUERY REWRITE PATTERNS FOR MATERIALIZED VIEWS

(71) Applicant: Oracle International Corporation, Redwood Shores, CA (US)

(72) Inventors: Murali Thiyagarajan, Concord, NH (US); Praveen T. J. Kumar, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 341 days.

(21) Appl. No.: 17/127,845

(22) Filed: Dec. 18, 2020

(65) Prior Publication Data

US 2022/0083548 A1 Mar. 17, 2022

Related U.S. Application Data

(60) Provisional application No. 63/078,242, filed on Sep. 14, 2020.

(51) Int. Cl.
  *G06F 16/2453* (2019.01)
  *G06F 16/23* (2019.01)
  *G06F 16/248* (2019.01)
  *G06F 18/214* (2023.01)
  *G06F 18/24* (2023.01)

(52) U.S. Cl.
  CPC .... *G06F 16/24539* (2019.01); *G06F 16/2358* (2019.01); *G06F 16/2393* (2019.01); *G06F 16/248* (2019.01); *G06F 18/2148* (2023.01); *G06F 18/24765* (2023.01)

(58) Field of Classification Search
  None
  See application file for complete search history.

(56) References Cited

U.S. PATENT DOCUMENTS

| | | | |
|---|---|---|---|
| 6,356,891 B1 | 3/2002 | Agrawal et al. | |
| 10,223,270 B1 * | 3/2019 | Audenaert | G06F 12/0246 |
| 10,909,094 B1 * | 2/2021 | Kumar | G06F 16/27 |
| 11,609,910 B1 * | 3/2023 | Papakonstantinou | G06F 16/24539 |
| 2001/0013030 A1 * | 8/2001 | Colby | G06F 16/24539 |
| 2003/0187864 A1 * | 10/2003 | McGoveran | G06F 16/284 707/999.102 |
| 2005/0071331 A1 * | 3/2005 | Gao | G06F 16/24547 |
| 2005/0234945 A1 | 10/2005 | Folkert et al. | |

(Continued)

OTHER PUBLICATIONS

Zilio et al., "Recommending Materialized Views and Indexes with IBM DB2 Design Advisor", Proc. of Intl. Conf. on Autonomic Computing, dated 2004, 24 pages.

(Continued)

*Primary Examiner* — Christopher J Raab
(74) *Attorney, Agent, or Firm* — Hickman Becker Bingham Ledesma LLP

(57) ABSTRACT

Techniques for a database management system to predict when in the future a materialized view will be used for query rewrite. This is a followed by an approach that uses the quiet rewrite pattern prediction to determine an optimized schedule for refreshing the materialized view. The approach combines the query rewrite pattern prediction with a quiet period prediction for the materialized view and an estimated refresh duration for the materialized view to determine the optimized refresh schedule for the materialized view.

20 Claims, 13 Drawing Sheets

(56) References Cited

U.S. PATENT DOCUMENTS

| | | | |
|---|---|---|---|
| 2005/0234971 A1 | 10/2005 | Folkert et al. | |
| 2007/0083500 A1 | 4/2007 | Zibitsker | |
| 2009/0018991 A1 | 1/2009 | Thiyagarajan et al. | |
| 2017/0111233 A1* | 4/2017 | Kokkula | H04L 41/0823 |
| 2018/0046926 A1* | 2/2018 | Achin | G06N 20/20 |
| 2019/0146471 A1* | 5/2019 | Maniak | G05B 23/0254 |
| | | | 700/80 |
| 2019/0354528 A1 | 11/2019 | Demazeau et al. | |
| 2020/0125964 A1 | 4/2020 | Hopper et al. | |
| 2020/0334254 A1* | 10/2020 | Arye | G06F 16/2393 |
| 2022/0083542 A1 | 3/2022 | Thiyagarajan et al. | |
| 2022/0083547 A1 | 3/2022 | Thiyagarajan et al. | |

OTHER PUBLICATIONS

Zilio et al., "DB2 Design Advisor: Integrated Automatic Physical Database Design", Proc. of 30th VLDB Conf., Toronto, Canada, dated 2004, 11 pages.

Zhou et al., "Efficient Exploitation of Similar Subexpressions for Query Processing", ACM SIGMOD, Beijing, China, dated 2007, 12 pages.

Lehner et al., "Fast Refresh Using Mass Query Optimization", IEEE, dated 2010, 8 pages.

Gupta et al., "Selection of Views to Materialize Under Maintenance Cost Constraint", Intl. Conf. on Database Theory, Jerusalem, Israel, dated 1999, 18 pages.

Goldstein et al., "Optimizing Queries Using Materialized Views: A Practical Scalable Solution", ACM SIGMOD, Santa Barbara, U.S. A, dated 2001, 12 pages.

Dageville et al. "Automatic SQL Tuning in Oracle 10g", Proc. of the 30th VLDB Conf., Toronto, Canada, dated 2004, 12 pages.

Chaudhuri et al., "Self-Tuning Database Systems: A Decade of Progress", Proc. of the 33rd VLDB Conf., Vienna Austria, dated 2007, 12 pages.

Chaudhuri et al., "An Efficient Cost-Driven Index Selection Tool for Microsoft SQL Server", Proc. of 23rd VLDB Conf., Athens, Greece, dated 1997, 10 pages.

Chaudhuri et al., "'What-If' Index Analysis Utility", Proc. of ACM SIGMOD, dated 1998, 12 pages.

Agarwal et al., "Database Tuning Advisor for Microsoft SQL Server 2005", Proc. of the 30th VLDB Conf., Toronto, Canada, dated 2004, 12 pages.

Agarwal et al., "Automated Selection of Materialized Views and Indexes for SQL Databases", Proc. of the 26th Int. Conf. on VLDB, Cairo, Egypt, dated 2000, 10 pages.

* cited by examiner

| Legend | |
|---|---|
| * | No expected rewrites. |
| M/N | Fresh. |
| M/N | Stale. |

| MV | Future Period of Time (x to x+5) | | | | | |
|---|---|---|---|---|---|---|
| | t = x | t = x+1 | t = x+2 | t = x+3 | t = x+4 | t = x+5 |
| MV-1 | * | 10/5 | 11/6 | 12/4 | 13/8 | 15/8 |
| MV-2 | * | * | 20/15 | * | * | 25/10 |
| MV-3 | * | 15/5 | 17/6 | * | * | 18/6 |

Figure 3A

| Legend | |
|---|---|
| * | No expected rewrites. |
| M/N | Fresh. |
| M/N | Stale. |

| Base DO | MV | Quiet Window (x to x+5) / Future Period of Time (x to x+5) | | | | | |
|---|---|---|---|---|---|---|---|
| | | t = x | t = x+1 | t = x+2 | t = x+3 | t = x+4 | t = x+5 |
| T-1 | MV-1 | * | 10/5 | 11/6 | 12/4 | 13/8 | 15/8 |
| | MV-2 | * | * | 20/15 | * | * | 25/10 |
| | MV-3 | * | 15/5 | 17/6 | * | * | 18/6 |

Figure 3B

| Legend | |
|---|---|
| * | No expected rewrites. |
| M/N | Execpted fresh. |
| M/N | Expected stale. |

| Base DO | MV | Quiet Window (x to x + 5) | | | | | | Benefit |
|---|---|---|---|---|---|---|---|---|
| | | Future Period of Time (x to x + 5) | | | | | | |
| | | t = x | t = x + 1 | t = x + 2 | t = x + 3 | t = x + 4 | t = x + 5 | |
| T-1 | MV-1 | Refreshing… | | 11/6 | 12/4 | 13/8 | 15/8 | 338 |
| | MV-2 | * | * | Refreshing… | | * | 25/10 | 250 |
| | MV-3 | * | 15/5 | 17/6 | | | 18/6 | 0 |

Figure 3C

| Legend | |
|---|---|
| * | No expected rewrites. |
| M/N | Fresh. |
| M/N | Stale. |

| Base DO | MV | Quiet Window (x to x+5) | | | | | | Benefit |
|---|---|---|---|---|---|---|---|---|
| | | Future Period of Time (x to x+5) | | | | | | |
| | | t = x | t = x+1 | t = x+2 | t = x+3 | t = x+4 | t = x+5 | |
| T-1 | MV-1 | * | 10/5 | 11/6 | Refreshing... | | 15/8 | 120 |
| | MV-2 | Refreshing... | | | * | * | 25/10 | 250 |
| | MV-3 | * | 15/5 | 17/6 | * | * | 18/6 | 0 |

Figure 3D

| Legend | |
|---|---|
| * | No expected rewrites. |
| M/N | Fresh. |
| M/N | Stale. |
| D | Update activity |

| Base DO | MV | t = x | t = x+1 | t = x+2 | t = x+3 | t = x+4 | t = x+5 | t = x+6 | t = x+7 |
|---|---|---|---|---|---|---|---|---|---|
| | | | Quiet Window-1 (x to x+5) | | | | | | |
| | | | Future Period of Time (x to x+7) | | | | | | |
| T-1 | MV-1 | * | 10/5 | 11/6 | 12/4 | 13/8 | 15/8 | D | D |
| | MV-2 | * | * | 20/15 | * | * | 25/10 | D | D |
| | MV-3 | * | 15/5 | 17/6 | * | * | 18/6 | D | D |
| T-2 | MV-4 | D | D | D | D | 18/10 | 20/5 | 17/10 | 20/12 |
| | MV-5 | D | D | D | D | 10/2 | * | 12/5 | 14/8 |
| | | | | | | Quiet Window-2 (x+4 to x+7) | | | |

Figure 3E

| Legend | |
|---|---|
| * | No expected rewrites. |
| M/N | Fresh. |
| M/N | Stale. |
| D | Update activity |

| | Future Period of Time-1 (x to x+5) | | | | | | Future Period of Time-2 (y to y+5) | | | | | |
|---|---|---|---|---|---|---|---|---|---|---|---|---|
| MV | t=x | t=x+1 | t=x+2 | t=x+3 | t=x+4 | t=x+5 | t=y | t=y+1 | t=y+2 | t=y+3 | t=y+4 | t=y+5 |
| MV-1 | * | D | D | D | D | D | 8/6 | 10/5 | 11/6 | 12/4 | 13/8 | 15/8 |
| MV-2 | D | * | D | D | D | D | * | * | 20/15 | * | * | 5/10 |
| MV-3 | * | D | D | D | D | D | 3/8 | 15/5 | 17/6 | * | * | 18/6 |
| MV-4 | D | D | D | D | D | * | * | 18/5 | 20/5 | 19/8 | 20/9 | 13/5 |
| MV-5 | D | D | D | D | D | D | * | 11/3 | 12/7 | 13/8 | 11/6 | 9/11 |

Figure 3F

PREDICTING FUTURE QUERY REWRITE PATTERNS FOR MATERIALIZED VIEWS

BENEFIT CLAIM

This application claims the benefit under 35 U.S.C. § 119(e) of provisional application 63/078,242, filed Sep. 14, 2020, by Murali Thiyagarajan et al., the entire contents of which is hereby incorporated by reference. The applicant hereby rescinds any disclaimer of claim scope in the parent applications or the prosecution history thereof and advise the USPTO that the claims in this application may be broader than any claim in the parent application.

TECHNICAL FIELD

The present disclosure relates to computer database management systems. More specifically, the present disclosure relates to computer-implemented techniques for predicting future query rewrite patterns for materialized views in database management system.

BACKGROUND

In database management systems, materialized views are a powerful mechanism for optimizing the processing of queries. A query may be defined as a logical expression over database data and the data relationships set forth in the database, and results in the identification of a subset of the database data. For example, the execution of a request for information from a database management system (DBMS) is typically issued by a client computer system as one or more Structured Query Language (SQL) queries or the like for retrieving particular data from database objects at a server computer system. A database object is any defined object in the database that is used to store or reference data. Examples of database objects include tables, indexes, views, and materialized views.

A materialized view is a database object that contains the results of a query. Instantiation of a materialized view is typically accomplished by executing the query against database objects and storing the result set of the query execution in another database object. The database object(s) referred to in the query from which the result set is derived are sometimes referred to as the "base" database object(s) of the materialized view and those database object(s) are sometimes said to be "referenced in" the materialized view by way of the query. The query that is executed against the base data object(s) to instantiate a materialized view is sometimes referred to herein as the "instantiation" query of the materialized view.

Consider, as a simple example, the following SQL query that provides an aggregation of the dollar amount sold every month:

SELECT t.calendar_month_desc,
  SUM(s.amount_sold) AS dollars
FROM sales s,
  times t
WHERE s.time_id=time_id
GROUP BY t.calendar_month_desc;

If the above query is used to instantiate a materialized view, then the sales, products, and times tables are the "base" database objects of the materialized view and those tables are "referenced in" the materialized view by way of the instantiation query.

When a database system receives a user query that asks for data from one or more base database objects of a materialized view, the database system may determine if the user query can be rewritten to be executed against the materialized view and thereby provide an answer to the user query more quickly. Returning the above example, consider, as a simple example, the following user query that asks for the sum of the amount sold for each calendar month:

SELECT t.calendar_month_desc,
  SUM(s.amount_sold)
FROM sales s,
  times t
WHERE s.time_id=time_id GROUP BY t.calendar_month_desc;

Without a materialized view and query rewrite functionality, the database system may need to perform computationally expensive operations in order to answer a user query that the database system would not need to perform if a materialized view and query rewrite functionality were available. In the current example user query, without the previous example materialized view and query rewrite functionality, the database system may need to access the "sales" database object directly and compute the sum of the amount sold to answer the user query. This might involve reading many million records from the "sales" database object which increases the query response time due to computer storage media (e.g., disk) access. The join in the user query also increases the query response time as the join needs to be computed on potentially many million rows.

In contrast, with the previous example materialized view and query rewrite functionality, the database system can rewrite the example user query to the following rewritten query to be executed against the materialized view:

SELECT calendar_month, dollars
FROM cal_month_sales_mv;

Here, "cal_month_sales_mv" is the given name of the previous example materialized view and "calendar month" and "dollars" are the given names of fields of the materialized view. Since the materialized view contains the results of the previous example instantiation query, the materialized view may contain only a few dozen records. Further, the rewritten query does not contain a join. Consequently, the database system can answer the previous example user query essentially instantaneously by executing the rewritten query against the materialized view and returning the result of the rewritten query as an answer to the user query. Clearly, materialized views are a powerful mechanism for optimizing the processing of queries.

A difference between a view and a materialized view is that a materialized view is typically instantiated once for many accesses while a view is typically instantiated for each access. Typically, this means that materialized view requires more computer storage media space to store the materialized view when the materialized view is not being accessed, but at the same time allows rewritten queries against the materialized view to be processed faster because the materialized view does not need to be instantiated for each rewritten query execution.

Since materialized views are not instantiated for each rewritten query execution, a materialized view can become "stale" with respect the base database object(s) referenced in the materialized view. In particular, changes to the base database objects referenced in a materialized view that occur after the materialized view is instantiated can place the materialized view in a stale state because the result set of the materialized view does not reflect the after-instantiation updates to the base database objects. In the case of a RDBMS, changes to the base database object(s) can occur, for example, as the result of data manipulation language (DML) statement executions against the base database object(s). Such DML statements may include SQL LOAD, INSERT, UPDATE, DELETE, or other SQL DML statements that change or modify database data in the base database objects. When a materialized view becomes stale, the instantiation query of the materialized view can be re-executed against the base database objects to re-instantiate the materialized view. In other words, the materialized view can be "refreshed".

When a materialized view is not stale, a database system may be able to rewrite user queries and execute the rewritten queries against the materialized view. However, if a materialized view becomes stale, then the database system may not be able to rewrite user queries that cannot tolerate the stale data contained in the materialized view. In this case, the database system cannot leverage the efficiencies provided by the materialized view to answer the user queries. Consequently, it can be important to efficient processing of user queries that materialized views are not stale, or at least not stale for extended periods of time.

One naïve strategy is to refresh a materialized view whenever there is a change to a base database object of the materialized view. However, this strategy does not scale well for large database systems with large amounts of data and frequent updates to base database objects. Such a strategy, if employed, might result in the database system continuously refreshing materialized views and constantly starving user queries of computing resources needed to execute the user queries.

Modern database systems are expected to be highly available for user queries. To support high availability, organizational policy may require that certain database maintenance operations be performed only during certain times or certain hours of the day. For example, policy may require that maintenance view refreshes occur during a designated maintenance window which may be, for example, one to two hours in the early morning hours of the day. Further, to prevent maintenance operations from affecting user queries, the maintenance operations may be allocated a capped amount of processing and storage resources to use during the maintenance window to accomplish the maintenance operations so as to prevent the maintenance operations from effectively monopolizing the available computing resources during the maintenance window. Refreshing a materialized view can take a significant amount of time especially when the base database object(s) contain large amounts of data. For example, refreshing a materialized view in a large data warehouse database can take many minutes (e.g., 30 minutes). With all these constraints on maintenance operations, if the database system has many stale materialized views that need to be refreshed during the maintenance window, it may not be possible to refresh all stale materialized views during the maintenance window.

The techniques disclosed herein address this and other issues.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The techniques are illustrated by way of example, and not by way of limitation, in the figures of the accompanying drawings and in which like reference numerals refers to similar elements and in which:

FIG. 3A depicts an example of query rewrite predictions for three materialized views.

FIG. 3B expands on the example of FIG. 3A in which all three materialized views reference the same base database object.

FIG. 3C expands on the example of FIG. 3B and shows a refresh schedule where a first materialized view is refreshed over two time intervals and then a second materialized view is refreshed over three time intervals.

FIG. 3D expands on the example of FIG. 3B and shows a refresh scheduled where a first materialized view is refreshed over three time intervals and then a second materialized view is refreshed over two time intervals.

FIG. 3E illustrates a refresh schedule example where different materialized views reference different base database objects.

FIG. 3F illustrates a refresh schedule example where there is ongoing update activity on the base database objects.

SUMMARY

Figure 1:
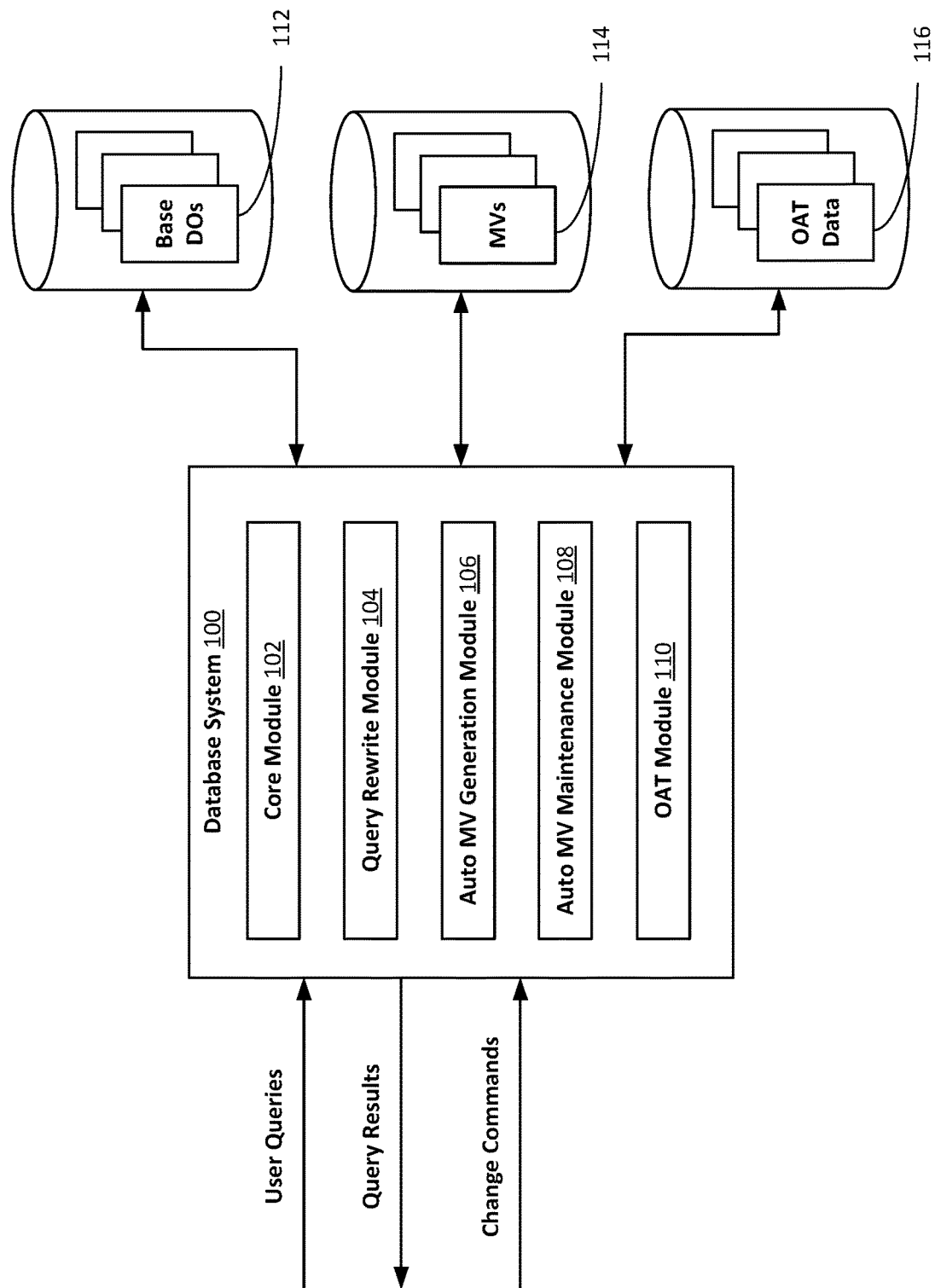
FIG. 1 is a block diagram of an example database system environment in which the techniques for predicting future query rewrite patterns for materialized views in database management systems and an approach for optimal materialized view refresh scheduling may be implemented.

The General Overview section of the Detailed Description of the invention below provides a useful overview of the techniques for predicting future query rewrite patterns for materialized views in database management systems.

DETAILED DESCRIPTION

In the following description, for the purposes of explanation, numerous specific details are set forth in order to provide a thorough understanding of the techniques. It will be apparent, however, that the techniques may be practiced without these specific details. In other instances, well-known structures and devices are shown in block diagram form in order to avoid unnecessarily obscuring the techniques.

The detailed description is organized below according to the following outline:
1.0 GENERAL OVERVIEW
2.0 EXAMPLE SYSTEM ENVIRONMENT
   2.1 CORE MODULE
   2.2 QUERY REWRITE MODULE
   2.3 AUTOMATIC MATERIALIZED VIEW GENERATION MODULE 2.4 AUTOMATIC MATERIALIZED VIEW MAINTENANCE MODULE
2.5 OBJECT ACTIVITY TRACKING MODULE
3.0 EXAMPLE PROCESS FOR AUTOMATIC MATERIALIZED VIEW MAINTENANCE
 3.1 MACHINE LEARNING MODELS GENERALLY
 3.2 QUIET PERIOD PREDICTION CLASSIFICATION MODEL
 3.3 QUERY REWRITE PREDICTION CLASSIFICATION MODEL
 3.4 QUERY REWRITE PREDICTION REGRESSION MODEL
 3.5 ESTIMATED REFRESH DURATION MODEL
 3.6 OTHER MACHINE LEARNING CONSIDERATIONS
 3.7 MODEL VALIDATION
 3.8 MODEL-BASED REFRESH PROCESS
 3.9 FALLBACK REFRESH PROCESS
4.0 EXAMPLE REFRESH SCHEDULES
5.0 EXAMPLE PROCESSES
 5.1 EXAMPLE PROCESS FOR PREDICTING FOR FUTURE QUIET PERIODS FOR MATERIALIZED VIEWS
 5.2 EXAMPLE PROCESS FOR PREDICTING FOR QUERY REWRITE PATTERNS FOR MATERIALIZED VIEWS
 5.3 EXAMPLE PROCESS FOR ESTIMATION REFRESH DURATIONS FOR MATERIALIZED VIEWS
6.0 DATABASE MANAGEMENT SYSTEM OVERVIEW
7.0 CLOUD COMPUTING OVERVIEW
8.0 BASIC COMPUTING DEVICE
9.0 BASIC SOFTWARE SYSTEM
10.0 OTHER ASPECTS OF THE DISCLOSURE 1. General Overview In general, the techniques allow a database management system to predict when in the future a materialized view will be used for query rewrite. This is followed by an approach that uses the query rewrite pattern prediction to determine an optimized schedule for refreshing the materialized view. The approach combines the query rewrite pattern prediction with a quiet period prediction for the materialized view and an estimated refresh duration for the materialized view to determine the optimized refresh schedule for the materialized view.

Consider the database management system having n number (e.g., between six and a few dozen) of stale materialized views at the end of the day. The approach for optimal refresh schedule determination may be implemented in the system to refresh the stale materialized views so as to maximize the number of query rewrites with the materialized views. A naïve approach could compute all distinct refresh schedules where each schedule encompasses of a distinct order in which the n materialized views are scheduled for refresh. This naïve approach might be computationally practical if it is assumed that all the materialized views have the same quiet periods and all materialized views take the same amount of time to refresh. However, in practice, different materialized views have different quiet periods and take different amounts of time to refresh.

As used herein, a "quiet period" for a materialized view refers to a period of time during which the base database object(s) referenced in the materialized view are not changed in a way that would cause the materialized view to become stale by the change. During a quiet period for a materialized view, the materialized view can be used by the database system for query rewrite. That is, the database system can rewrite eligible user queries to execute against the materialized view in addition to or instead of the base database object(s) referenced in the materialized view.

Changes to the base database object(s) that render the materialized view stale can occur as a result of DML statements executed by the database system against the base database object(s). For example, the DML statements can include LOAD, (e.g., as in load specified data into a base database object), INSERT (e.g., as in insert specified data into a base database object), DELETE (e.g., as in delete data from a base database object), and UPDATE (e.g., as in update or modify data in a base database object) statements that create, update, or delete user data in the base database object(s). Other types of database management systems may have similar or equivalent operations or statements.

Changes to the base database object(s) that render the materialized view stale can occur because of partition maintenance operations (PMOPS) on the base database object(s), in addition to or instead of changes resulting from execution of DML statements against the base database object(s). "Partitioning" refers to functionality of a database management system that allows a database object to be subdivided into small pieces referred to as "partitions," enabling a large database object to be managed and access at a finer level of granularity. A database object can be partitioned by a database management system according to a variety of different partitioning schemes including, but not limited to, range partitioning (e.g., data of a database object is mapped to partitions based on ranges of values of a partitioning key), list partitioning (e.g., data of a database object is mapped to partitions by lists of discrete values of a partitioning key), and hash partitioning (e.g., data of a database object is mapped to partition based on a hashing algorithm applied values of a partitioning key). PMOPS on the base database object(s) that can render the materialized view stale include, for example, DROP (e.g., as in dropping a partition from a set of partitions of a base database object), ADD (e.g., in adding a partition to a set of partitions of a base database object), MERGE (e.g., as in merging the contents of two partitions in a set of partitions of a base database object into a single partition in the set), and SPLIT (e.g., as in redistributing the contents of a single partition in a set of partitions of a base database object into two new partitions in the set).

Returning to the example use case, different materialized views may be based on different sets of base database object(s). Further, the different sets of base database objects may be changed at different times, contain different amounts of data, and involve differing instantiation query complexity in terms of joins and other database data operations. Consequently, an assumption that different materialized views have the same quiet periods and the same refresh durations is not practical.

The approach described herein can be used to generate an optimal refresh schedule for a set of stale materialized views even in the case where the materialized views have different quiet periods, different query rewrite patterns, and different refresh times. For example, consider two stale materialized views MV-1 and MV-2. The approach described herein can be implemented in a database managements system to determine all of the following:

Which of the two materialized views (MV-1 or MV-2) is more likely to be used for query rewrite next?
 For the materialized view that is more likely to be used for query rewrite next, how many query rewrites against the materialized view are expected to occur during the upcoming quiet window for the materialized view?

For the materialized view that is more likely to be used for query rewrite next, are the base database object(s) referenced in the materialized view likely to be changed after its next refresh and before its next expected query rewrite usage?

When do the next quiet windows for the two materialized views probably begin?

How long will each of the next quiet windows for the two materialized views last?

For the materialized view that is more likely to be used for query rewrite next, what is its expected refresh duration?

For the materialized view that is more likely to be used for query rewrite next, is the expected refresh duration of the materialized view such that it would adversely affect its expected number of query rewrites?

What are the expected net query rewrite benefits of the two materialized views?

The approach employs machine learning to determine both (1) when a given stale materialized view will be used next to rewrite a query and (2) how often the materialized view will be used for query rewrite during the materialized view's next quiet window. In some implementations, the approach tackles the first determination as a machine learning classification task and the second determination as a machine learning regression task.

Workloads that arrive at the database system may have a pattern. For example, change operations on base database objects such as execution of DML statements and PMOPs typically arrive during off-peak periods (e.g., nights or weekends) whereas user queries typically arrive during regular business hours during the day. However, real-world workloads typically do not conform to a strict well-defined pattern that can be modeled by a well-known mathematical function. In particular, the noise in a real-world workload pattern makes it impractical to use simple probability or statistical based prediction models. The approach described herein eschews those simpler approaches in favor of a machine learning-based approach that incorporates regularization techniques to deal with any noise found in real-world workload patterns.

In some embodiments, the approach is employed within an autonomous database management system to relieve a database system administrator from manually determining refresh schedules for materialized views. This manual approach may be error prone and may end up causing system downtime or degraded query processing performance if the database system administer selects a refresh schedule that does not adequately reflect the seasonality of the quiet periods of the materialized views in the system. In this case, the materialized views may be refreshed at sub-optimal times or otherwise at times that do not maximize query rewrite usage of the materialized views. With the disclosed approach, stale materialized views may be automatically scheduled for refresh in an autonomous manner and in a way that maximizes query rewrite usage. Indeed, the approach may do a better job at scheduling materialized views for refresh than a database system administrator would, thereby improving the operation of the database management system both in terms of conserving computing resources and in terms of improving query processing because fewer queries may miss the opportunity for a query rewrite because a materialized view is stale.

2. Example System Environment

Referring to FIG. 1, it is a block diagram of an example database system environment in which the disclosed techniques may be implemented. The environment includes computer database management system 100. System 100 includes various modules include core module 102, query rewrite module 104, automatic materialized view generation module 106, automatic materialized view maintenance module 108, and object activity tracking module 110. System 100 is operatively coupled to various computer storage media storing base database objects 112, materialized views 114, and object activity tracking (OAT) data 116. Overall, among other operations, system 100 is configured to process input user queries and output query results thereto.

2.1 Core Module

Core module 102 performs fundamental database management system operations. In operation, client computing devices, via core module 102, create data in, retrieve data from, update data in, and delete data from, base database objects 112. Base database objects 112 may include tables (relations). Each table itself contains one or more records of data. Base database objects 112 may encompass many tables, each of which stores information about a particular type of entity. A typical table may contain only a few records up to millions of records. Each record of a table may be divided into fields. Each field contains a particular attribute of the record. For example, a record of a "sales" table corresponding to a sale may include information about the sale's product identifier, customer identifier, time, quantity sold, and amount sold.

In operation, client computing devices issue user queries (e.g., SQL SELECT commands) to system 100 for retrieving, via core module 102, particular data (e.g., data records meeting the query condition) from base database objects 112. In addition to retrieving data from base database objects 112, client computing devices also have the ability to issue change commands (e.g., DML commands) via core module 102 to load and insert new data into base database objects 112, or to update or delete existing data in base database objects 112. Core module 102 also supports database administration commands submitted from client computing devices such as PMOPS on base database objects 112, creating new base database objects 112, altering or deleting existing base database objects 112, creating new materialized views 114, and altering or deleting existing materialized views 114.

2.2 Query Rewrite Module

System 100 also has query rewrite module 104 for rewriting user queries originally intended for execution against base database objects 112 to rewritten queries that are executed at least in part against materialized views 114. The results of the rewritten queries are returned by system 100 as query results to the submitted user queries. Query rewrite module 104 may rewrite user queries to rewritten queries to speed up query processing by system 100. That is, query rewrite module 104 may rewrite a user query to a corresponding rewritten query if query rewrite module 104 can determine that rewriting the user query and executing the rewritten query instead of executing the user query will result in improved query processing performance (e.g., reduced query processing latency as defined roughly by a time period that starts when the user query arrives at system 100 and ends when system 110 produces the query results).

Query rewrite module 104 may rewrite a user query submitted from a client computing device in a way that is transparent to the client computing device. That is, aside from the query result being obtained more quickly from system 100, the transformation of the user query to the rewritten query and the execution of the rewritten query by query rewrite module 104 may be transparent to the client computing device.

In operation, query rewrite module 104 may subject a user query to several checks to determine whether it is a candidate for query rewrite. If the user query fails any of the checks, then the user query is executed against one or more base database objects 112 rather than a materialized view. Failure to rewrite a user query can be costly in terms of query processing latency and computing resources consumed.

Query rewrite module 104 may use different methods to recognize when to rewrite a user query in terms of a materialized view. One possible method is based on matching the text of the user query with the text of the instantiation query of the materialized view according to a text matching algorithm. If text matching fails, query rewrite module 104 may use a more general matching algorithm in which query rewrite module 104 compares joins, selections, fields, grouping fields, and aggregation functions between the user query and the instantiation query materialized view.

Query rewrite module 104 can perform full or partial text matching between the user query and the instantiation query of the materialized view. If a full text match is made, query rewrite module 104 is able to rewrite the user query entirely in terms of the materialized view. However, if only a partial text match is made, then query rewrite module 104 rewrites the user query where one or more of the base database objects referenced in the user query remain referenced in the rewritten query in addition to a reference to the materialized view. If query rewrite module 104 cannot make either a full or partial text match between the user query and the instantiation query of the materialized view, the query rewrite module 104 may attempt to match the user query to the instantiation query according to the general matching algorithm.

Query rewrite module 104 may rewrite a user query to a rewritten query with a delta join. There are two types of delta joins: a "user query" delta join and a "materialized view" delta join. A user query delta join is a join that appears in the user query but not in the instantiation query of the materialized view. Any number and type of user delta joins in a user query may be allowed and they may simply be retained when the user query is rewritten to reference the materialized view. Upon rewrite, the materialized view is joined to the appropriate tables in the user query delta. A materialized view delta join is a join that appears in the instantiation query of the materialized view but not in the user query. A materialized view delta join may be required to be a lossless and non-duplicating with respect to the result of common joins.

Query rewrite module 104 may support query rewrite with partition change tracking. In this case, a base database object referenced in a materialized view may be partitioned into multiple partitions and the staleness of the materialized view is tracked on a per-partition basis rather than for the entire base database object. As a result, some records of the materialized view can be fresh (not stale) while others are stale. In particular, only the records of the materialized view derived from data in the changed partition(s) of the base database object need to be marked stale. Other records of the materialized view derived from unchanged partition(s) remain fresh. If a given user query only needs data from records of the materialized view that are fresh, then query rewrite module 104 can still rewrite the user query to execute against the materialized view even though some of the records of the materialized view are stale.

Query rewrite module 104 may support rewrite hints. A rewrite hint in a user query tells query rewrite module 104 to rewrite the user query to execute against a materialized view even if query rewritten module 104 determines the cost of rewriting and executing the rewritten query outweighs the benefit of doing so. A no rewrite hint in a user query tells query rewrite module 104 to not rewrite the user query and to execute the user query against base database objects 112 even if query rewrite module 104 determines there would be a cost benefit in rewriting the user query and executing the rewritten user query against a materialized view.

A query rewrite opportunity may be missed with respect to a materialized view if the materialized view is stale, or is stale in relevant part (e.g., for partition tracked materialized views). For example, query rewrite module 104 may make a preliminary determination that a given user query would benefit from or is a candidate for rewrite against a particular materialized view. However, if the data the user query requests from the particular materialized view is stale and the user query cannot tolerate staleness (e.g., as indicated by a rewrite hint in the user query), then an opportunity to rewrite the user query to execute the particular materialized view has been missed. In that case, if the user query cannot be rewritten to be executed against another materialized view, then the user query may be executed against base database objects 112 without rewriting the user query to execute against a materialized view. This is sometimes referred to herein as a missed query rewrite with respect to the particular materialized view.

2.3 Automatic Materialized View Generation Module

As part of an autonomous database management system, system 100 may include automatic materialized view generation module 106. Module 106 may analyze a workload of a set of user queries and automatically generate a set of materialized views capable of rewriting a substantial number of user queries. Module 106 may select materialized views based on cost and verify the selected materialized views in the database system environment of system 100. Module 106 may encompass an automated system that generates, selects, and verifies materialized views. As such, some or all of materialized views 114 may be materialized views automatically generated by module 106. While all materialized views 114 can be automatically generated by module 106, some or all materialized views 114 can be created by a database administrator. Thus, materialized views 114 can be all automatically generated, all database administrator generated, or a mix of automatically generated and database administrator created.

Automatic materialized view generation module 106, and automatic materialized view maintenance module 108 discussed in greater detail below, may run autonomously and continually in system 100 as separate tasks. The modules 106 and 108 may run as low-profile tasks that are limited in the amount of system 100 computing resources (e.g., CPU resources) they can consume so as not to starve potentially more critical tasks (e.g., core module 102) of system 100 of computing resources.

Generation module 106 may be configured to analyze a workload of user queries to determine and create materialized views that would significantly improve user query execution performance. In operation, module 106 process and classifies the workload user queries. Like user queries are grouped together by query patterns such as, for example, group by, selections, orderings, etc. Module 106 forms materialized view recommendations based on the classifications. Each recommendation may include one or more recommended materialized views. Recommended materialized views are verified. A recommended materialized view may not be published by module 106 to the set of active materialized views 114 until module 106 confirms the value of the materialized view. Verification of a recommended materialized view before publishing may involve executing workload user queries to verify that a performance improvement is provided by the recommended materialized view.

2.4 Automatic Materialized View Maintenance Module

As part of an autonomous database system, system 100 may include automatic materialized view maintenance module 108 for automatically maintaining materialized views 114 including determining and carrying out an optimal refresh schedule for stale materialized views according to the approach described herein. Using machine learning, module 108 can automatically identify established patterns of stale materialized views needing refresh. Module 108 can then automatically and timely (just-in-time) refresh of those materialized views.

In operation, module 108 may run autonomously and continually within system 100. Module 108 may perform materialized view maintenance operations on a timer or on a scheduled event. For example, module 108 can check for stale materialized views once a day or every hour or according to another established schedule. If module 108 discovers a quiet period pattern and a query rewrite pattern from OAT data 116 for a stale materialized view using machine learning, then module 108 may schedule the materialized view for refresh provided is the materialized view still then exists and is still stale. If module 108 cannot discover these patterns (e.g., because there is insufficient OAT data 116 for the materialized view to discover the patterns), the module 108 may schedule the materialized view for refresh according to a fallback refresh scheduling approach. One example of a fallback refresh scheduling approach is described in greater detail elsewhere in this description.

2.5 Object Activity Tracking Module

System 100 may include object activity tracking module 110 for tracking change activity on base database objects 112 and query rewrite activity on materialized views 114. OAT data that module 110 collects is stored in computer storage media as OAT data 116. OAT data 116 is used by machine learning components of automatic materialized view maintenance module 108 to predict future quiet periods, future query rewrite patterns, and refresh durations for materialized views 114.

OAT module 110 may automatically and continually track activity on base database objects 112 and materialized views 114. In some implementations, OAT module 110 captures a snapshot of activity every x number of minutes. The parameter x might be five, ten, or fifteen minutes, as just some examples. Each snapshot may encompass of a number of counters reflecting activity that occurred during the snapshot. Thus, a snapshot encompasses a period of time (e.g., a five, ten, or fifteen-minute period of time). A record of each snapshot may be stored in computer storage media by OAT module 110 as part of OAT data 116.

With respect to a given base database object (e.g., a table), OAT module 110 may track and record in OAT data 116 all the following change activity information in a snapshot, a subset of this information, or a superset thereof:

NUM LOADS—the number of records in the base database object in load operations (e.g., DML LOADs) during the snapshot,
NUM INSERTS—the number of records in the base database object in insert operations (e.g., DML INSERTs) during the snapshot,
NUM DELETES—the number of records in the base database object in delete operations (e.g., DML DELETEs) during the snapshot, and
NUM UPDATES—the number of records in the base database object in update operations (e.g., DML UPDATEs) during the snapshot.

With respect to a partitioned base database object, OAT module 110 may track and record in OAT data 116 all of the following change activity information in a snapshot, a subset of this information, or a superset thereof:

NUM DROPS—the number of records of the partitioned base database object affected by partition drop operations during the snapshot,
NUM ADDS—the number of records of the partitioned base database object affected by partition add operations during the snapshot,
NUM MERGES—the number of records of the partitioned base database object affected by partition merge operations during the snapshot, and
NUM SPLITS—the number of records of the partitioned base database object affected by partition split operations during the snapshot.

With respect to a given materialized view, OAT module 110 may track and record in OAT data 116 all of the following query rewrite activity information in a snapshot, a subset of this information, or a superset thereof:

NUM REWRITES—the number of user query rewrites against the materialized view during the snapshot where each rewrite is broken down in one of the following rewrite categories:
query rewrite using the text matching algorithm,
query rewrite using the general matching algorithm,
partial query rewrite,
delta query rewrite,
query rewrite using partition change tracking, and
query rewrite using a rewrite hint;
NUM MISSES—the number of user query rewrite misses for the materialized view during the snapshot where each rewrite miss is broken down in one the following rewrite miss categories:
missed user query rewrite due to a no-rewrite hint, and
missing user query rewrite due to the materialized view being stale.

In the above, a query rewrite is counted only if the rewritten query is executed against the materialized view. User queries that are rewritten merely for cost-benefit estimation purposes, but that are not actually executed against a materialized view, are not counted as a query rewrite in the above. Similarly, user queries that are rewritten merely for cost-benefit estimation purposes and without a plan to possibly execute the rewritten query against a materialized view are not counted as a miss in the above.

With respect to a given materialized view, OAT module 110 may track and record in OAT data 116 all of the following materialized view refresh activity information for each refresh of a materialized view, a subset of this information, or a superset thereof:

MV CARDINALITY—the total number of records in the materialized view prior to the refresh,
NT—the number of base database object(s) referenced in the materialized view,
NTC—the number of base database object(s) referenced in the materialized view involved in change operations after the prior refresh of the materialized view and before the current refresh of the materialized view,
REF TYPE—can be one of:
FAST—incremental refresh using materialized view logs,
FULL—full refresh resulting in recreating/re-instantiating the materialized view, or PCT—partition-based refresh based on partition change tracking.

RL—the number of records in the base database object(s) involved in DML LOAD operations after the prior refresh of the materialized view and before the current refresh of the materialized view, RI—the number of records in the base database object(s) involved in DML INSERT operations after the prior refresh of the materialized view and before the current refresh of the materialized view, RD—the number of records in the base database object(s) involved in DML DELETE operations after the prior refresh of the materialized view and before the current refresh of the materialized view, RU—the number of records in the base database object(s) involved in DML UPDATE operations after the prior refresh of the materialized view and before the current refresh of the materialized view, and REFRESH TIME—a stopwatch time elapsed or a CPU time used to refresh the materialized view.

3. Example Process for Automatic Materialized View Maintenance

Figure 2:
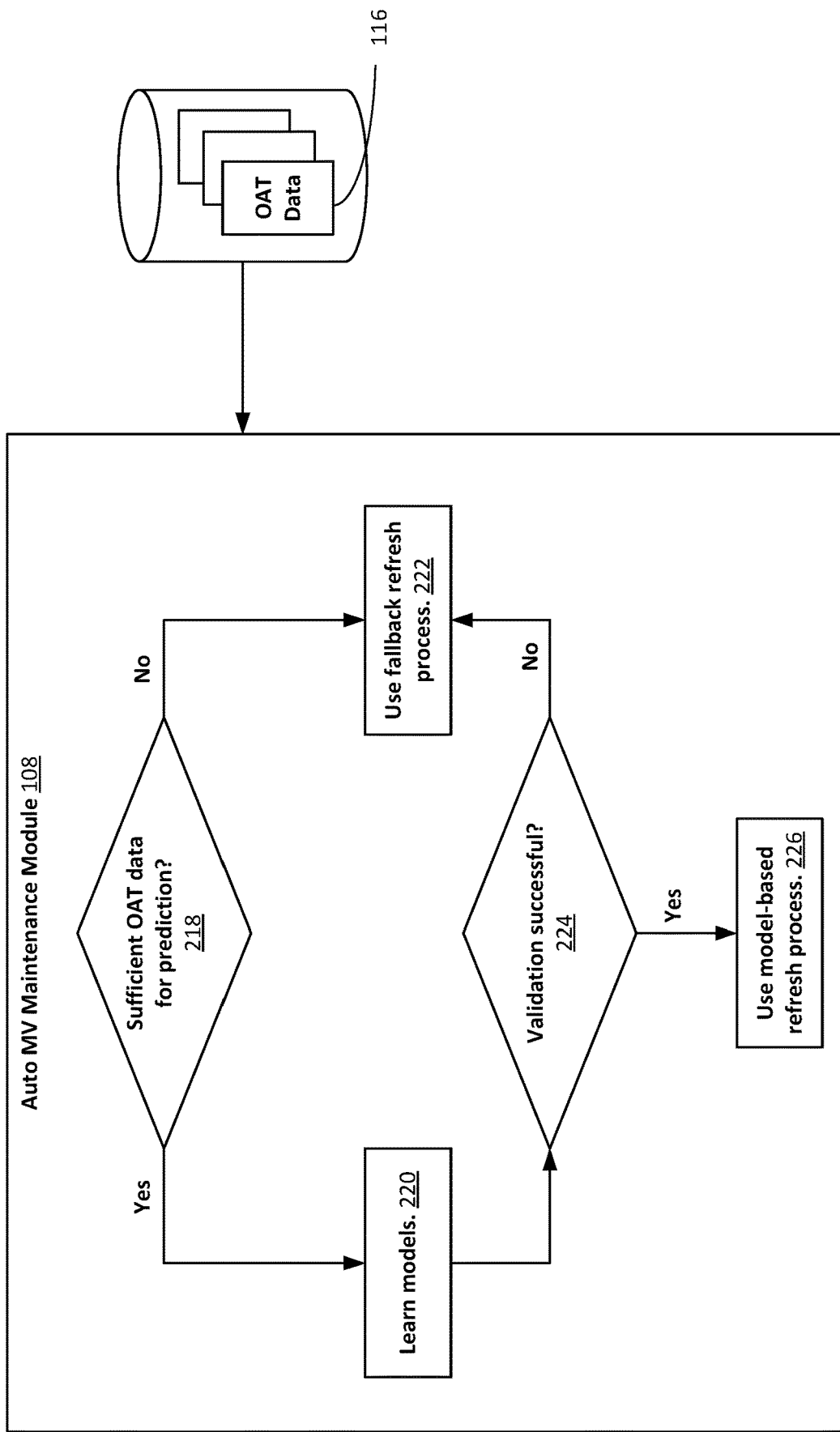
FIG. 2 is a schematic of an example process for automatic materialized view maintenance.

FIG. 2 schematically depicts an example process for automatic materialized view maintenance. The process is performed by automatic materialized view maintenance module 108 in some implementations. The process may be performed periodically (e.g., once a day) or in response to an event (e.g., in response to a database administrator command) for each stale materialized view in a given set of one or more then stale materialized views. As another example, the process may be performed automatically in response to detecting that the number of stale materialized views in the system has exceeded a threshold (e.g., greater than 50% of all materialized views are stale). At the time the process is performed, a materialized view may have become stale as a result of prior change operations performed on the base database object(s) refenced in the materialized view.

At a high-level, module 108 determines 218 whether there is sufficient OAT data 116 for using machine learning to make predictions about future quiet periods for a given stale materialized view, future query rewrite patterns for the stale materialized view, and estimated refresh durations for stale materialized view. If module 108 determines 218 there is not sufficient OAT data 116 to make the predictions, then the module 108 uses 222 a fallback refresh approach to schedule the stale materialized view for refresh. On the other hand, if module 108 determines 218 there is sufficient OAT data 116 to make the predictions, then the module 108 learns 220 models for making the predictions from OAT data 116. Module 108 then validates the learned models. If module 108 determines 224 that validation of the learned models was successful, then module 108 uses 226 the learned models to determine an optimal refresh schedule for the stale materialized view. Otherwise, if module 108 determines 224 that validation of the learned models was not successful, then module 108 uses 222 the fallback refresh approach to schedule the stale materialized view for refresh.

Assuming the fallback refresh approach is not used, the process may be repeated for each stale materialized view in a given set of stale materialized views for determining an optimal refresh schedule for the set of materialized views. The set of materialized views may be those of materialized views 114 that at the end of the day or at a certain time are then currently stale. The refresh schedule may encompass a priority ordering of the materialized views in the set. The stale materialized views may then be scheduled for refresh in the priority order such that the number of query rewrites for incoming user queries is maximized. It should be noted that the priority order may determine the order in which the materialized views are scheduled for refresh which may or may not be the same order in time in which they are refreshed. For example, the priority order may be used to determine which materialized views should be refreshed within a given period of time. For example, the top-N number of materialized views in the priority order may be selected to be refreshed during the given period of time. Then those top-N materialized views can be scheduled for refresh during the given period of time based on various factors included the estimate refresh durations of the materialized views and when during the given period of time the future quiet periods for the materialized views are predicted to occur.

In some embodiments, a stale materialized view selected to be refreshed is scheduled to be refreshed such that the refresh of the materialized view will complete according to the estimated refresh duration for the materialized view at or around the start of a predicted future quiet period for the materialized view. In this way, the probability that the materialized view is not stale for most or all the predicted future quiet period is maximized.

For refresh, the database management system may support incremental refresh and full refresh. With full refresh, the materialized view is rebuilt from scratch by executing the instantiation query that defines the materialized view. With incremental refresh, the materialized view is not rebuilt from scratch. Instead, the database management system keeps a log or logs of changes that occur to the underlying base database object(s) so that the materialized view can be refreshed incrementally based on the changes logged. The database management system may also support partition change tracking incremental refresh which can be used by the database management system if the modified base database object(s) are partitioned and the modified based database object partitions can be used to identify the affected partitions or portions of data in the materialized view. For example, partition change tracking incremental refresh may be used when there have been some partition maintenance operations (PMOPs) on the base database object(s). Partition change tracking incremental refresh may remove all data in an affected materialized view partition or affected portion of data and recompute just that partition or portion from scratch. Incremental refresh, whether log-based or partition change tracking-based, is typically much faster and consumes far fewer computing resources than a full refresh.

Returning to the top of the process, at decision 218, module 108 determines 218 if there is sufficient accumulated OAT data 116 to make predictions about a given stale materialized view. Module 108 may make determination 218 for each stale materialized view. Module 108 may determine 281 whether there is sufficient accumulated OAT data 116 for a given stale materialized view based on various factors. One factor may be the number of recently accumulated historical snapshots available in OAT data 116 or the amount of time covered by recently accumulated historical snapshots available in OAT data 116. For example, if OAT data 116 has recently accumulated historical snapshots for each of the base database objects referenced in the materialized view and for the materialized view covering at least a threshold amount of time, then module 108 may determine 218 there is sufficient OAT data 116 for the materialized view to make the predictions. The threshold amount of time may be a number of days, a number of weeks, a number of months, or other suitable threshold amount of time. Generally, the threshold amount of time may be selected based on an approximate, average, mean, or minimum number of most recently accumulated historical snapshots of OAT data 116 needed to learn models that pass validation of the models. For example, if approximately a week's worth of most recently accumulated snapshots is sufficient to learn models that pass validation of the models, then the threshold amount of time may be approximately a week.

In one example implementation where snapshots are fifteen minutes in length, approximately 1,000 snapshots worth (approximately 10½ days' worth) of historical OAT data 116 was sufficient to learn k-nearest neighbors, support vector machine, decision tree, feed-forward artificial neural network, and Naïve Bayes classification models with Area Under the Curve (AUC) scores between approximately 0.84 and 0.95. The same number of snapshots was sufficient to learn k-nearest neighbors, support vector machine, decision tree, feed-forward artificial neural network, and Naïve Bayes regression models between with scaled Root Mean Squared (RMS) errors between 0.68 and 0.78.

If, at decision 218, module 108 determines 218 there is sufficient OAT data 116 to learn models for a given stale materialized view, then module 108 learns 220 the models for the materialized view. General, the models are learned in a supervised learning fashion using labeled training sets that are based on recent OAT data 116. A model may be learned in a batch fashion, when enough historical data is available, or in an incremental (online) fashion according to the requirements of the particular implementation at hand. In some implementations, four different models are learned 220 for each stale materialized view: (1) a quiet period prediction classification model, (2) a query rewrite prediction classification model, (3) a query rewrite prediction regression model, and (4) an estimated refresh duration model. Techniques for learning these models are described in greater detail elsewhere herein.

3.1 Machine Learning Models Generally

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, being executed, and/or generating an output or predication, a computer system process executing a machine learning algorithm applies the model artifact against the input to generate a predicted output. A computer system process executes a machine learning algorithm by executing software configured to cause execution of the algorithm. When a machine learning model is referred to as performing an action, a computer system process executes a machine learning algorithm by executing software configured to cause performance of the action.

Classes of problems that machine learning (ML) can be used for include clustering, classification, regression, anomaly detection, prediction, and dimensionality reduction (e.g. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (e.g. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C #, Ruby, Lua, Java, MatLab, R, and Python. The DBMS DATA MINING package provided by Oracle has a rich collection of popular machine learning algorithms found in the literature.

3.2 Quiet Period Prediction Classification Model

The quiet period prediction classification model for a materialized view may be trained as a classifier to predict, given a future time interval, whether change operations will occur on any of the base database object(s) referenced in the materialized view during the future time interval. For example, the quiet period prediction classification model may be trained according to any one of the following of machine learning classification algorithms: k-nearest neighbors, support vector machine, decision tree, feed-forward artificial neural network, or Naïve Bayes.

Multiple predictions for multiple consecutive future time intervals within a target future window of time can be made using the quiet period prediction classification model to determine if there are any future quiet periods for the materialized view within the target window. In this context, a quiet period for a materialized view is a future time interval or two or more consecutive time intervals during which the model predicts there will not be any change activity on any of the base database object(s) referenced in the materialized view.

Module 108 can generate a training set from historical OAT data 116 for the base database object(s) referenced in the materialized view. A training example of the training set can be generated for each historical snapshot of a set of snapshots of the OAT data 116. For example, one thousand training examples can be generated for one thousand snapshots of OAT data 116 for the base database object(s) referenced in the materialized view. A training example may include all of the following seasonality features for machine learning derived from a corresponding snapshot, a subset of these seasonality features, or a superset thereof:

the hour of the day of the snapshot (e.g., an integer value between 0 and 23), the day of the week of the snapshot (e.g., an integer value between 0 and 6), the week of the month of the snapshot (e.g., an integer value between 0 and 4), the month of the year of the snapshot (e.g., an integer value between 0 and 11), and the time slot of the day of the snapshot which depends on the length of snapshots (e.g., if snapshots are fifteen minutes in length, then a value between 0 and 95).

The label of a training example may be a binary label that indicates either (1) there was update activity on at least one of the base database object(s) referenced in the materialized view during the snapshot, or (2) there was no update activity on any of the base database object(s) referenced in the materialized view during the snapshot. To determine whether there was update activity on a base database object during the snapshot, module 108 may read OAT data 116 for the snapshot. Module 108 may assign a binary label to the training example indicating there was update activity for the materialized view during the snapshot if the OAT data 116 for the snapshot indicates that at least one of the base database object(s) referenced in the materialized view was involved in an DML operation such as, for example, or LOAD, INSERT, DELETE, or UPDATE, or involved in a PMOP such as a DROP, ADD, MERGE, or SPLIT. If none of the base database object(s) was involved in a DML operation or a PMOP operation during the snapshot, then module 108 may assign a binary label to the training example indicating that was no update activity for the materialized view during the snapshot.

When module 108 uses the learned quiet period prediction classification model for the materialized view to make a prediction about a future time interval, module 108 may generate a sample for input to the learned model. The sample may include all the seasonality features discussed above of the future time interval, a subset of these seasonality features, or a superset thereof. The output of the learned model may be a value predicting either (1) there will be update activity on at least one of the base database object(s) referenced in the materialized view during the future time interval, or (2) there will not be any update activity on any of the base database object(s) referenced in the materialized view during the future time interval.

3.3 Query Rewrite Prediction Classification Model

The query rewrite prediction classification model for a materialized view may be trained as a classifier model to predict, given a future time interval, whether the materialized view will be used for query rewrite during the future time interval. For example, the query rewrite prediction classification model may be trained according to any one of the following of machine learning classification algorithms: k-nearest neighbors, support vector machine, decision tree, feed-forward artificial neural network, or Naïve Bayes.

Multiple predictions for multiple consecutive future time intervals within a target future window of time can be made using the query rewrite prediction classification model to determine if and when the materialized view will be used for query rewrite.

Module 108 can generate a training set from historical OAT data 116 for the materialized view. A training example of the training set can be generated for each historical snapshot of a set of snapshots of the OAT data 116. For example, one thousand training examples can be generated for one thousand snapshots of OAT data 116 for the materialized view. A training example may include all of the following seasonality features for machine learning derived from a corresponding snapshot, a subset of these seasonality features, or a superset thereof:

the hour of the day of the snapshot (e.g., an integer value between 0 and 23), the day of the week of the snapshot (e.g., an integer value between 0 and 6), the week of the month of the snapshot (e.g., an integer value between 0 and 4), the month of the year of the snapshot (e.g., an integer value between 0 and 11), and the time slot of the day of the snapshot which depends on the length of snapshots (e.g., if snapshots are ten minutes in length, then a value between 0 and 143).

The label of a training example may be a binary label that indicates either (1) there was query rewrite executed against the materialized view during the snapshot, or (2) there was no query rewrites executed against the materialized view during the snapshot. To determine whether there was a query rewrite executed against the materialized view during the snapshot, module 108 may read OAT data 116 for the snapshot. Module 108 may assign a binary label to the training example indicating there were query rewrites executed against the materialized view during the snapshot if the OAT data 116 for the snapshot indicates there was at least one query rewrite executed against the materialized view during the snapshot (e.g., NUM REWRITES for the snapshot and the materialized view is greater than zero). Module 108 may assign a binary label to the training example indicating that was no query rewrite activity for the materialized view during the snapshot if the OAT data 116 for the snapshot indicates that were no query rewrites executed against the materialized view during the snapshot (e.g., NUM REWRITES for the snapshot and the materialized view equals zero).

When module 108 uses the learned query rewrite prediction classification model for the materialized view to make a prediction about a future time interval, module 108 may generate a sample for input to the learned model. The sample may include all of the seasonality features discussed above of the future time interval, a subset of these seasonality features, or a superset thereof. The output of the learned model may be a value predicting either (1) there will be at least one query rewrite executed against the materialized view during the future time interval, or (2) there will not any query rewrites executed against the materialized view during the future time interval.

3.4 Query Rewrite Prediction Regression Model

The query rewrite prediction regression model for a materialized view may be trained as a regression model to predict, given a future time interval, the number of query rewrites that will use the materialized view during the future time interval. For example, the query rewrite prediction classification model may be trained according to any one of the following of machine learning regression algorithms: k-nearest neighbors, support vector machine, decision tree, feed-forward artificial neural network, or Naïve Bayes.

In some implementations, if the query rewrite prediction classification model predicts that a materialized view will be used for query rewrite during a particular future time interval, then the query rewrite prediction regression model is used to predict the number of user queries for which the materialized view will be used for query rewrite during the particular future time interval.

Module 108 can generate a training set from historical OAT data 116 for the materialized view. A training example of the training set can be generated for each historical snapshot of a set of snapshots of the OAT data 116. For example, one thousand training examples can be generated for one thousand snapshots of OAT data 116 for the materialized view. A training example may include all of the following seasonality features for machine learning derived from a corresponding snapshot, a subset of these seasonality features, or a superset thereof:

- the hour of the day of the snapshot (e.g., an integer value between 0 and 23),
- the day of the week of the snapshot (e.g., an integer value between 0 and 6),
- the week of the month of the snapshot (e.g., an integer value between 0 and 4),
- the month of the year of the snapshot (e.g., an integer value between 0 and 11), and
- the time slot of the day of the snapshot which depends on the length of snapshots (e.g., if snapshots are five minutes in length, then a value between 0 and 287).

The label of a training example may be a number that specifies the number of query rewrites executed against the materialized view during the snapshot. To determine the number of query rewrites executed against the materialized view during the snapshot, module 108 may read OAT data 116 for the snapshot (e.g., NUM REWRITES for the snapshot and the materialized view).

When module 108 uses the learned query rewrite prediction regression model for the materialized view to make a prediction about a future time interval, module 108 may generate a sample for input to the learned model. The sample may include all of the seasonality features discussed above of the future time interval, a subset of these seasonality features, or a superset thereof. The output of the learned model may be a value predicting the number of query rewrites that will be executed against the materialized view during the future time interval.

3.5 Estimated Refresh Duration Model

The estimated refresh duration model for a materialized view may be trained as a linear regression model to predict, given a materialized view, how long it will take to refresh the materialized view.

Module 108 can generate a training set from historical OAT data 116 for the materialized view. A training example of the training set can be generated for each historical refresh of the materialized view in the OAT data 116. A training example may include all of the following refresh duration features for machine learning derived from a corresponding historical refresh of the materialized view, a subset of these refresh duration features, or a superset thereof:

- the total number of records in the materialized view prior to the historical refresh,
- the number of base database object(s) referenced in the materialized view,
- the number of base database object(s) referenced in the materialized view involved in change operations after the prior historical refresh of the materialized view and before the current historical refresh of the materialized view,
- the number of records in the base database object(s) involved in DML LOAD operations after the prior historical refresh of the materialized view and before the current historical refresh of the materialized view,
- the number of records in the base database object(s) involved in DML INSERT operations after the prior historical refresh of the materialized view and before the current historical refresh of the materialized view,
- the number of records in the base database object(s) involved in DML DELETE operations after the prior historical refresh of the materialized view and before the current historical refresh of the materialized view, and
- the number of records in the base database object(s) involved in DML UPDATE operations after the prior historical refresh of the materialized view and before the current historical refresh of the materialized view.

The label of a training example may be a number that specifies the time (e.g., stopwatch time or CPU time) needed to complete the current historical refresh of the materialized view. To determine the time, module 108 may read OAT data 116 for the historical refresh (e.g., REFRESH TIME for the historical refresh of the materialized view).

When module 108 uses the learned estimated refresh duration model for the materialized view to make a prediction about the estimated refresh duration for the materialized view, module 108 may generate a sample for input to the learned model. The sample may include current values for the materialized view of all of the refresh duration features discussed above, a subset of these refresh duration features, or a superset thereof. In particular, the sample may include all of the following refresh duration features for the materialized view, a subset of these refresh duration features, or a superset thereof:

- the current total number of records in the materialized view,
- the current number of base database object(s) referenced in the materialized view,
- the current number of base database object(s) referenced in the materialized view involved in change operations after the prior refresh of the materialized view up,
- the current number of records in the base database object(s) involved in DML LOAD operations after the prior refresh of the materialized view,
- the current number of records in the base database object(s) involved in DML INSERT operations after the prior refresh of the materialized view,
- the current number of records in the base database object(s) involved in DML DELETE operations after the prior refresh of the materialized view, and
- the current number of records in the base database object(s) involved in DML UPDATE operations after the prior refresh of the materialized view.

The output of the learned model may be a value estimating the time (e.g., stopwatch time or CPU time) needed to refresh the materialized view.

3.6 Other Machine Learning Considerations

In the example above, the process learns 220 four models for each stale materialized views. However, in other implementations, the process learns 220 three of the four models for each stale materialized view and learns one of the four types of models for multiple stale materialized views. In particular, module 108 may learn 220 a separate quiet period prediction classification model, a separate query rewrite prediction classification model, and a separate query rewrite prediction regression model for each stale materialized view using historical OATS data 116 for that materialized view. However, module 108 may learn 220 an estimated refresh duration model for some or all the stale materialized views using the historical OATS data 116 for the multiple materialized views. This may be possible because the input features to the estimated refresh duration model and the estimated refresh times output by the model are comparable across materialized views. The learned estimated refresh duration model may then be used to predict estimated refresh durations for any of the multiple materialized views.

In some implementations, each of the quiet period prediction classification model, the query rewrite prediction classification model, and the query rewrite prediction regression model are each based on a k-nearest neighbors, a support vector machine, a decision tree, a feed-forward artificial neural network, or a Naïve Bayes machine learning algorithm.

In the case of a feed-forward artificial neural network, the number of hidden neurons can be selected based on the number of examples in the training set, the number of input neurons, and the number of output neurons. For classification models, there may be only one output neuron. Similarly, regression models may contain only one output neuron. In some implementations of a feed-forward neural network model, six hidden neurons in two hidden layers (three hidden neurons in each hidden layer) are used for nine input neurons and one output neuron. The first hidden layer uses logistic sigmoid activation functions and the second hidden layer uses Tan h activation functions. However, other feed-forward neural network model configurations are possible and a feed-forward neural network model used in an implementation is not limited to any particular number of input neurons, any particular number of hidden layers, any particular number of hidden neurons, or particular type of activation functions, or any particular number of hidden neurons per hidden layer.

In some implementations of k-nearest neighbors-based model for any of the quiet period prediction classification model, the query rewrite prediction classification model, or the query rewrite prediction regression model, the parameter k with a value of three (3) has shown to provide sufficiently accurate predictions in experiments. However, values for greater than three (3) may be used.

The computational cost of learning the quiet period prediction classification model, the query rewrite prediction classification model, or the query rewrite prediction regression model can be relatively expensive, especially for a large amount of historical OAT data used in a training set. According, in some implementations, the quiet period prediction classification model, the query rewrite prediction classification model, or the query rewrite prediction regression model for a materialized view is re-learned only when the prediction accuracy falls below a predetermine threshold or when the current model becomes too old. To do this, before re-learning a model, module 108 can cross-validate the current model using recent OAT data which may include OAT data that is more recent than the OAT data from which the current model was previously learned. If the current model fails the cross-validation by having a prediction below a predetermine threshold (e.g., 75%), then model may be re-learned based on the recent OAT data to replace the current model. The current model may also be replaced if it is older (has been in used) for greater than a threshold amount of time (e.g., two weeks).

In some implementations, the estimated refresh duration model is based on simple linear regression such as, for example, a Generalized Linear Regression Model (GLRM).

The above discussion refers to machine learning features as in features of training examples and features of samples. Such features may be pre-processed by module 108 before being used to learn a model in the case of a training example or before being used to make a prediction based on a learned model in the case of a sample. Such pre-processing may include scaling features values (e.g., by min-max normalization, mean normalization, Z-score normalization, or unit length normalizing).

The set of features used for learning a model and used in samples to make predictions using the learned model can be selected according to a feature engineering approach to determine the most relevant features and to prevent feature explosion. Such an approach may use a supervised learning technique (e.g., Minimum Description Length (MDL)) to determine feature important.

3.7 Model Validation

Once the four models are learned 220 for a given materialized view, the models are validated. In some implementations, a model is validated using an N-fold cross-validation technique before being used for predictions. In some implementations, N is five. The N-fold cross-validation technique divides the training set for the model into N number of 100/N % chunks. The machine learning algorithm is then run N times, each time using a different (100−(100/N) % of the training set as training data, and the remaining 100/N % of the training set as test data.

At operation 224, module 108 determines whether all four models pass cross-validation according to a predetermined accuracy threshold (e.g., a predetermined accuracy score of at least 75%). If one or more of the four models do not pass cross-validation, then the fallback refresh process is used 222 to determine a refresh schedule for the materialized view. However, if all four models pass cross-validation, then the model-based refresh process is used 226 is used to determine a refresh schedule for the materialized view.

3.8 Model-Based Refresh Process

For the materialized views for which the four models are learned 220 and pass validation, the models can be used to predict the following for each such materialized view:

which future time intervals, if any, during a future window of time the materialized view will be quiet (e.g., no change activity on the base database object(s) referenced in the materialized view is predicted), which future time intervals, if any, during the future window of time the materialized view will not be quiet (e.g., change activity on the base database object(s) referenced in the materialized view is predicted), which future time intervals, if any, during the future window of time the materialized view will be used for query rewrite, for each future time intervals in a set of one or more future time intervals, the predicted number of rewrites for which the materialized view will be used, which future time intervals, if any, during the future window of time the materialized view will not be used for query rewrite, and the time needed to refresh the materialized view.

The set of stale materialized views are then scheduled for refresh during the future window of time in descending order of their effective net benefit, which is computed using their cost benefits, estimated refresh times, and quiet periods. In some implementations, the future window of time is a scheduled maintenance window during which materialized view maintenance operations such as materialized view refreshes are allowed to be performed according to system 100 operational policy, service level agreement, or the like. However, the future window of time is not limited to corresponding to a scheduled maintenance window and may correspond to any future window of time for which it is desired to determine a refresh scheduled for a set of then stale materialized views.

In some implementations, the cost benefit $B_{MV_i}$ of a materialized view $MV_i$ being fresh during a predicted quiet period is computed as represented by the following equation:

$$B_{MV_i} = \sum_{t=t_1}^{t_2} b(MV_i) \times n(MV_i, t)$$

In the above equation, b($MV_i$) represents the performance benefit of using the materialized view $MV_i$ in terms of user query execution performance over not having the materialized view $MV_i$ available for query rewrite. The parameter n($MV_i$, t) represents the predicted number of query rewrites using the materialized view $MV_i$ during future snapshot t. The parameter $t_1$ represents the snapshot when the quiet period of the materialized view $MV_i$ is predicted to start and the parameter $t_2$ represents a subsequent snapshot when the quiet period of the materialized view $MV_i$ is predicted to end. The quiet period represented by the parameters $t_1$ and $t_2$ may encompass one or more consecutive snapshots during the future window.

In some implementations, if the number of stale materialized views that need to be scheduled is below a threshold number (e.g., eight or lower), then the total benefit is computed for all possible orderings of the materialized views and an order that provides the greatest total benefit is used to schedule the materialized views for refresh. It should be noted that the future time window during which materialized views are allowed to be refreshed may not be sufficiently long for all materialized views to be refreshed within the time window. Accordingly, when computing a total benefit for a particular ordering of the materialized views, those materialized views in the particular ordering that would not complete refresh within the future time window according to their estimated refresh durations are not included in the total benefit calculation for the particular ordering. Thus, the total benefit for a particular ordering of the materialized views may be computed as the sum of the cost benefits of the materialized views in the particular order that can be refreshed before the time window ends.

If the number of stale materialized views is greater than a threshold (e.g., eight), then computing the total benefit for all possible orderings of the materialized views may be combinatorically prohibitive. In this case, the cost benefit computed for each materialized view can be divided the materialized view's predicated refresh duration to determine a refresh duration-adjusted cost benefit. The materialized views may then be scheduled for refresh in descending order of the refresh duration-adjusted cost benefits.

Module 108 may schedule a materialized view for refresh such that the refresh of the materialized view completes just before the predicted quiet periods for the materialized view is about to start. Consequently, depending on when the predicted quiet periods are for the set of stale materialized views, the materialized views may be refreshed in a different order than which they are scheduled for refresh. Thus, the descending ordering of a set of stale materialized views according their respective cost benefits or respective refresh duration-adjusted cost benefits determines the order in which the materialized views are scheduled for refresh, which is not necessarily (but can be) the same order in time in which the materialized views are refreshed.

3.9 Fallback Refresh Process

If, at decision 218, module 108 determines there is not sufficient OAT data for learning 220 models or, at decision 224, module 108 determines that validation of the learned 220 models was not successful, then module 108 may fall back to using 222 another refresh scheduling algorithm such as a heuristic-based algorithm. For example, module 108 might exclude materialized views referring to base database objects that have undergone recent change activity (e.g., within the N most recent snapshots). In some implementations, the default value of N is four. Using this heuristic, module 108 may find a quiet period to avoid refreshing those materialized views that are likely to become stale immediately after refresh. The remaining stale materialized views may then be scheduled for refresh, followed by any materialized views that were excluded previously, in descending order of their query rewrite performance benefits.

4. Example Refresh Schedules

FIG. 3A depicts an example of query rewrite predictions for three materialized views MV-1, MV-2, and MV-3. The predictions are made for six future time intervals in a future time window spanning the six future time intervals. For example, time t=x may be midnight on a particular day and the six future time intervals corresponding to fifteen-minute time slots starting at midnight between midnight and 1:30 AM on the day. The predictions may be made just before midnight.

Where a table cell contains an asterisk '*', the corresponding materialized view is not predicted to be used for any query rewrites during the corresponding future time interval.

Where a value M/N is given in a table cell, the value M represents the performance benefit of using the corresponding materialized view during the corresponding future time interval in terms of user query execution performance over not using the materialized view available for query rewrite during the corresponding future time interval. The value M may be based on cost benefits computed for past user queries executed against the corresponding materialized view during historical instances of the time interval. For example, the value of 10 in the table cell for materialized view MV-1 and future time interval t=x+1 indicates that past user queries rewritten to be executed against the materialized view MV-1 during previous instances of the time interval (e.g., between 12:15 AM and 12:30 AM on previous days) have enjoyed a 10X performance improvement than if the user queries were not rewritten and instead executed against the underlying base database objects of the materialized view. The value N represents the predicted number of query rewrites that are executed to use the corresponding materialized view during the corresponding future time interval. For example, five (5) user queries are expected to user materialized MV-1 during future time interval t=x+1 (e.g., between 12:15 AM and 12:30 AM).

For purpose of understanding FIG. 3B, FIG. 3C, and FIG. 3D, table cells where the M/V is presented in white lettering in a black filled cell represent time intervals when the corresponding materialized view is stale. Table cells where the M/V is presented in black lettering in a white filled cell represent time intervals when the corresponding materialized view is fresh.

FIG. 3B expands on the example in FIG. 3A. In FIG. 3B, all three materialized views MV-1, MV-2, and MV-3 reference the same base database object T-1. Base database object T-1, and hence all three materialized views, is predicted to have a quiet period spanning the entirety of the future time window (e.g., between midnight and 1:30 AM). If none of the materialized views are refreshed during the future time window, they will remain stale for the entirety of the future time window.

With respect to FIG. 3B, assume that the estimated refresh durations predicted for materialized views MV-1, MV-2, and MV-3 are 2 time intervals, 3 time intervals, and 2 time intervals, respectively. In this case, if only one materialized view can be refreshed at a time because of computing resource constraints, then it is not possible to refresh all materialized views within the six-time interval future time window. Thus, the task is to select two of the three materialized views to refresh that maximizes the query rewrite benefit. Note that in some implementations, two or more materialized views may be allowed to be refreshed concurrently or in parallel. In this case, a refresh schedule can still be determined, and materialized views can be scheduled for refresh in the order determined by the refresh schedule including refreshing multiple materialized views for concurrent or parallel refresh.

FIG. 3C expands on the example in FIG. 3B and shows a refresh schedule where materialized view MV-1 is refreshed over 2 time intervals and then materialized view MV-2 is refreshed over 3 time intervals. The total cost benefit of this schedule may be computed as the sum of the cost benefit for materialized view MV-1 (e.g., (11*6)+(12*4)+(13*6)+(15*8)=388) and the cost benefit for materialized view MV-2 (e.g., (25*10)=250), or 388+250=588.

FIG. 3D also expands on the example in FIG. 3B but shows a refresh scheduled where materialized view MV-2 is refreshed over 3 time intervals and then materialized view MV-1 is refreshed over 2 time intervals. The total cost benefit of this scheduled may be computed as the sum of the cost benefit for materialized view MV-2 (e.g., (25*10)=250) and the cost benefit for materialized view MV-1 (e.g., (15*8)=120), or 250+120=370. Thus, the schedule of FIG. 3C should be preferred over the schedule of FIG. 3D in order to maximize query rewrite benefit between the two schedules. Note that there are still other possible schedules to be computed before it can be determined which schedule maximizes the query rewrite benefit among all possible schedules (e.g., (MV-1, MV-3), (MV-3, MV-1), (MV-2, MV-3), and (MV-3, MV-2)).

FIG. 3E illustrates an example where different materialized views reference different base database objects. In this case, the future time window may contain more than one quiet period. In this example, materialized views MV-1, MV-2, and MV-3 reference base database object T-1 while materialized views MV-4 and MV-5 reference base database object T-2. The future time window is eight (8) time intervals in length. A quiet period for base database object T-1, and hence materialized views MV-1, MV-23, and MV-3, is predicted to span the first six (6) time intervals and a quiet period for base database object T-2, and hence materialized views MV-4 and MV-5, is predicted to span the last four time intervals of the future time window.

When determining a refresh schedule for a set of stale materialized views (e.g., MV-1 through MV-5), materialized view(s) that have the same quiet period may be considered separately from other subsets of materialized views that have different quiet periods. For example, a refresh scheduling order for materialized views MV-1, MV-2, and MV-3 may be determined separately from a refresh scheduling order for materialized views MV-4 and MV-5. In the table of FIG. 3E, a letter "D" indicates there is update activity on the corresponding base database object during the corresponding time interval.

FIG. 3F illustrates an example where there is ongoing update activity on the base database objects. In such a case, a future time window may not contain any quiet periods. For example, the table of FIG. 3F depicts that there are no quiet periods during Future Time Window-1. However, later, during Future Time Window-2, there are quiet periods and materialized views that could be potentially use for query rewrite.

5. Example Processes

The following description presents method steps that may be implemented using processing-executable instructions, for directing operation of one or more computing devices under control of processor(s). The processor-executable instructions may be stored on a non-transitory storage media. The processor-executable instructions may also be stored as a set of downloadable processor-executable instructions, for example, for downloading and installation from an Internet location (e.g., a web site).

5.1 Example Process for Predicting Future Quiet Periods for Materialized Views

Figure 4:
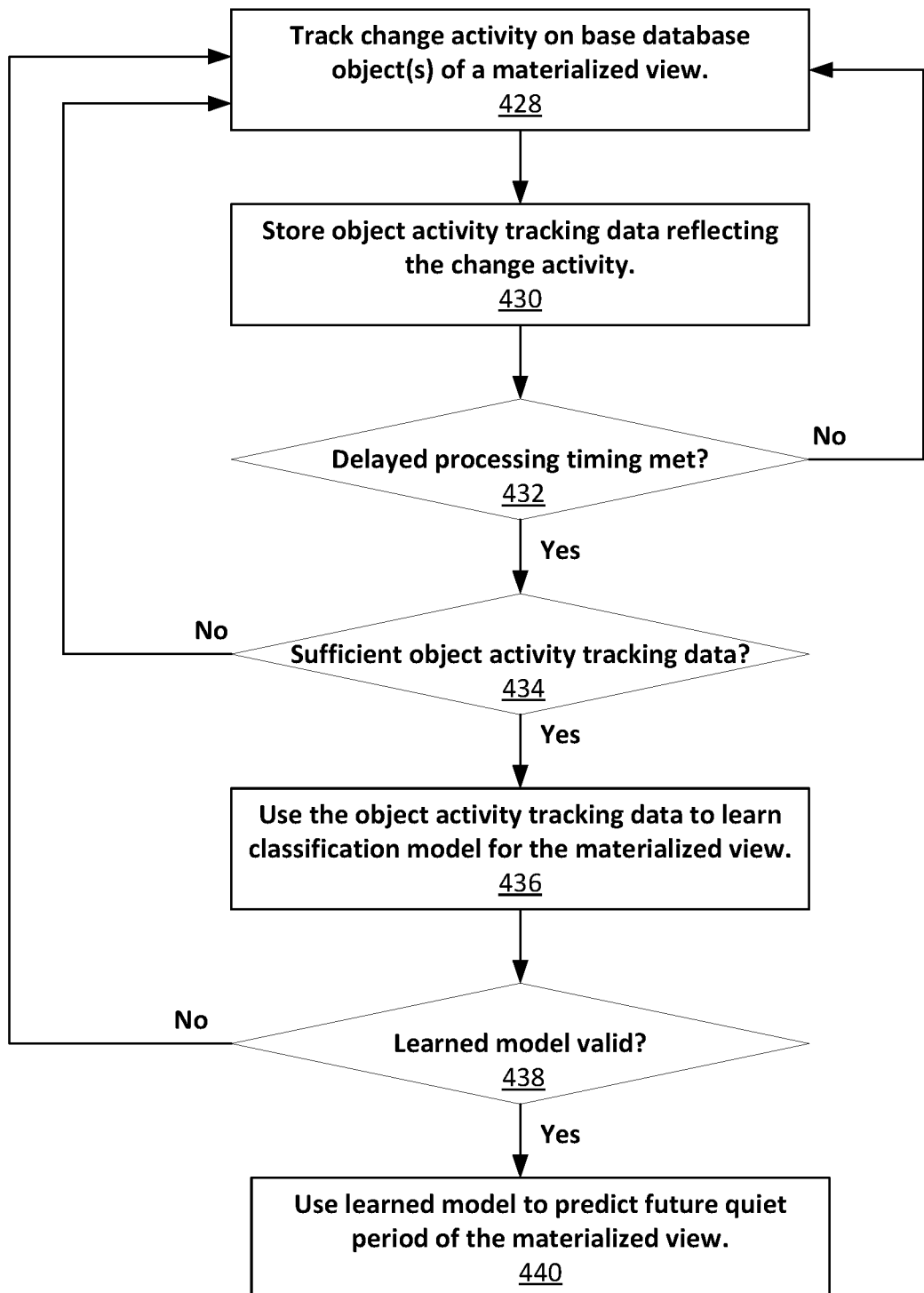
FIG. 4 is a flowchart illustrating the steps of operation of techniques for predicting future quiet periods for materialized views.

FIG. 4 comprises a flowchart illustrates the steps of operation of the techniques for predicting future quiet periods for materialized views. As described above, the method operates to learn a classification model for a stale materialized view based on recent change activity on the base database object(s) referenced in the materialized view. If the learned model can be successfully validated, then the learned model is used to predict whether change activity will occur on the base database object(s) referenced in the materialized view during one or more future time intervals. The predictions can be used for a variety of purposes including for determining when in the future the materialized view will have quiet periods when no change activity occurs on the base database object(s) referenced in the materialized view. A refresh of the materialized view can then be scheduled to complete just before the quiet period for the materialized view is predicted to begin so as to the maximize query rewrite benefit provided by the materialized view.

At step 438, change activity on the base database object(s) referenced in the materialized view is continually tracked in snapshots over time. The change activity may include, for example, DML operations and PMOP operations on the base database object(s). At step 440, object activity tracking data reflecting the tracked change activity is stored in computer storage media.

At step 442, it is determined whether a delayed processing timing has been met. This determination may be based on the passage of an amount of time (e.g., 24 hours), reaching a certain time (e.g., 2:00 AM), or in response to detecting of an event (e.g., a user input). If the delayed processing timing has not been met, the method continues to track 428 change activity and store 430 object activity data over time. Once the delayed processing timing is met, the method proceeds to step 434.

At step 434, it is determined whether there is sufficient object activity tracking data reflecting the recent change activity of the base database object(s) referenced in the materialized view to learn the quiet period prediction classification model. For example, this determination may be based on the number of recent snapshots of the object activity tracking data that are available. For example, if there are more than a threshold number of recent snapshots, then it may be determined that there is sufficient object activity data. Otherwise, the method continues to track 428 change activity and store 430 object activity data over time. For example, for fifteen-minute snapshots, a minimum of 200 recent snapshots (just over two days' worth) may be the threshold.

At step 436, if there is a sufficient amount of object activity tracking data, then a quiet period prediction classification model is learned for the materialized view based on the recent object activity tracking data reflecting the recent change activity of the base database object(s) referenced in the materialized view.

At step 438, the learned model is validated using the k-fold cross-validation technique. If the learned model is successfully validated, then the learned model is used 440 to predict future quiet periods for the materialized view. Otherwise, the method returns to tracking 428 change activity and storing 430 object activity data over time.

Figure 5:
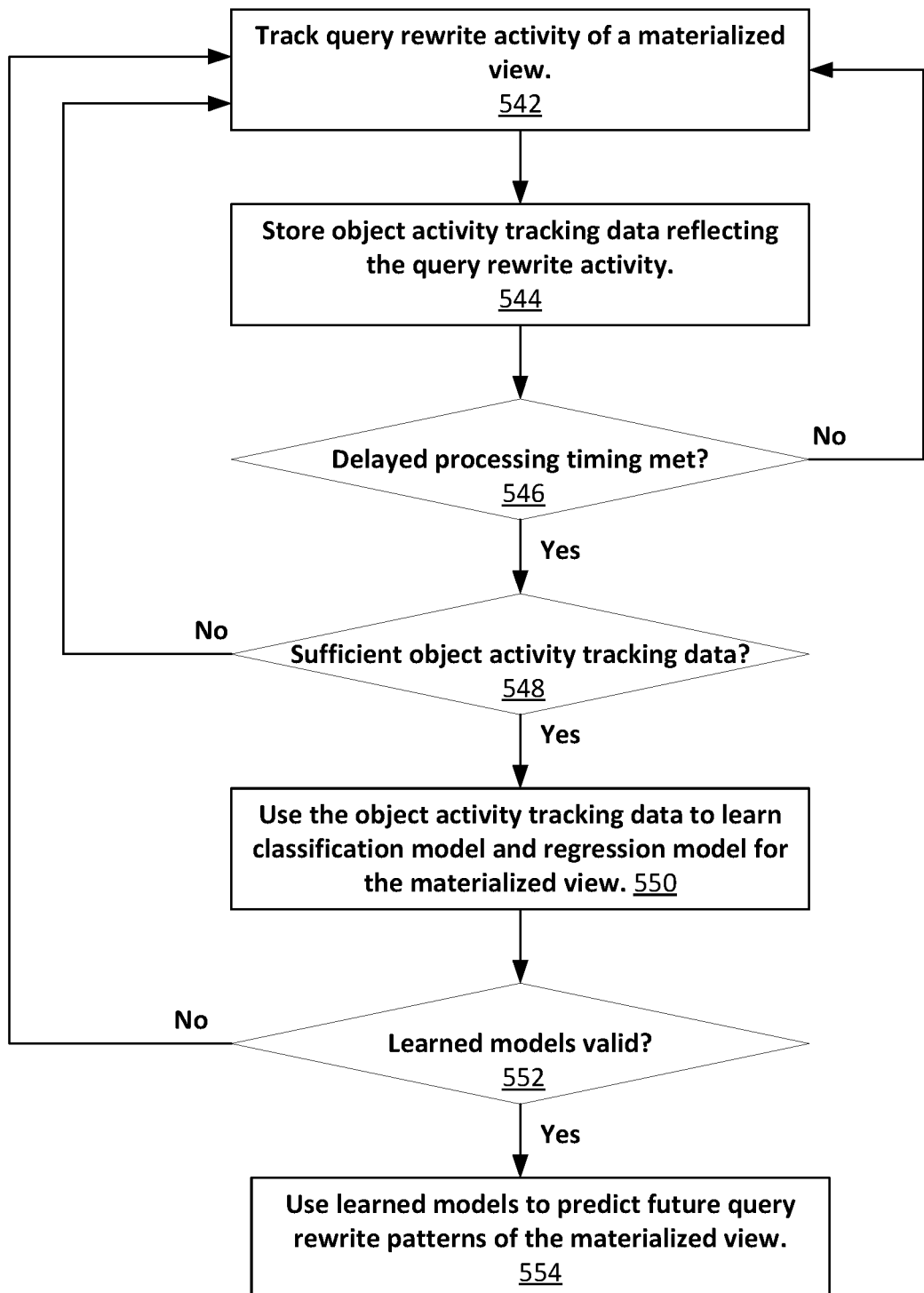
FIG. 5 is a flowchart illustrating the steps of operation of techniques for predicting future query rewrite patterns for materialized views.

5.2 Example Process for Predicting Future Query Rewrite Patterns for Materialized Views FIG. 5 comprises a flowchart illustrates the steps of operation of the techniques for predicting future query rewrite patterns for materialized views. As described above, the method operates to learn a classification model and a regression for a stale materialized view based on recent query rewrite activity of the materialized view. If the learned model can be successfully validated, then the learned model is used to predict whether rewrite activity will occur for the materialized view during one or more future time intervals. The predictions can be used for a variety of purposes including for determining when in the future the materialized view will have quiet rewrite usage. A refresh of the materialized view can then be scheduled at a time that maximizes the predicted future query rewrite usage.

At step 542, query rewrite activity of the materialized view is continually tracked in snapshots over time. The rewrite activity may include, for example, a number of times per snapshot that the materialized view is used for query rewrite. In other words, the number of user queries rewritten and executed against the materialized per-snapshot. At step 544, object activity tracking data reflecting the tracked rewrite activity is stored in computer storage media.

At step 546, it is determined whether a delayed processing timing has been met. This determination may be based on the passage of an amount of time (e.g., 24 hours), reaching a certain time (e.g., 2:00 AM), or in response to detecting of an event (e.g., a user input). If the delayed processing timing has not been met, the method continues to track 542 query rewrite activity of the materialized view and store 544 object activity data reflecting the activity over time. Once the delayed processing timing is met, the method proceeds to step 548.

At step 548, it is determined whether there is sufficient object activity tracking data reflecting the recent rewrite activity of the materialized view to learn the query rewrite prediction classification model and the query rewrite prediction regression model. For example, this determination may be based on the number of recent snapshots of the object activity tracking data that are available. For example, if there are more than a threshold number of recent snapshots, then it may be determined that there is sufficient object activity data. Otherwise, the method continues to track 542 query rewrite activity of the materialized view and store 544 object activity data reflecting the activity over time. For example, for fifteen-minute snapshots, a minimum of 200 recent snapshots (just over two days' worth) may be the threshold.

At step 550, if there is a sufficient amount of object activity tracking data, then a query rewrite prediction classification model and a query rewrite prediction regression model are learned for the materialized view based on the recent object activity tracking data reflecting the recent query rewrite activity for the materialized view.

At step 552, the learned models are each validated using the k-fold cross-validation technique. If the learned models are successfully validated, then the learned models are used 554. In particular, the query rewrite prediction classification model is used to predict whether the materialized view will be used for query rewrite during a plurality of future time intervals. And for each such time interval in which the materialized view is predicted by the classification model to be used for query rewrite, the query rewrite prediction regression model is used to predict the number of times the materialized view will be used for query rewrite during the time interval. If the models cannot be validated, then the method returns to tracking 542 query rewrite activity of the materialized view and storing 544 object activity data reflecting the activity over time.

5.3 Example Process for Estimating Refresh Durations for Materialized Views

Figure 6:
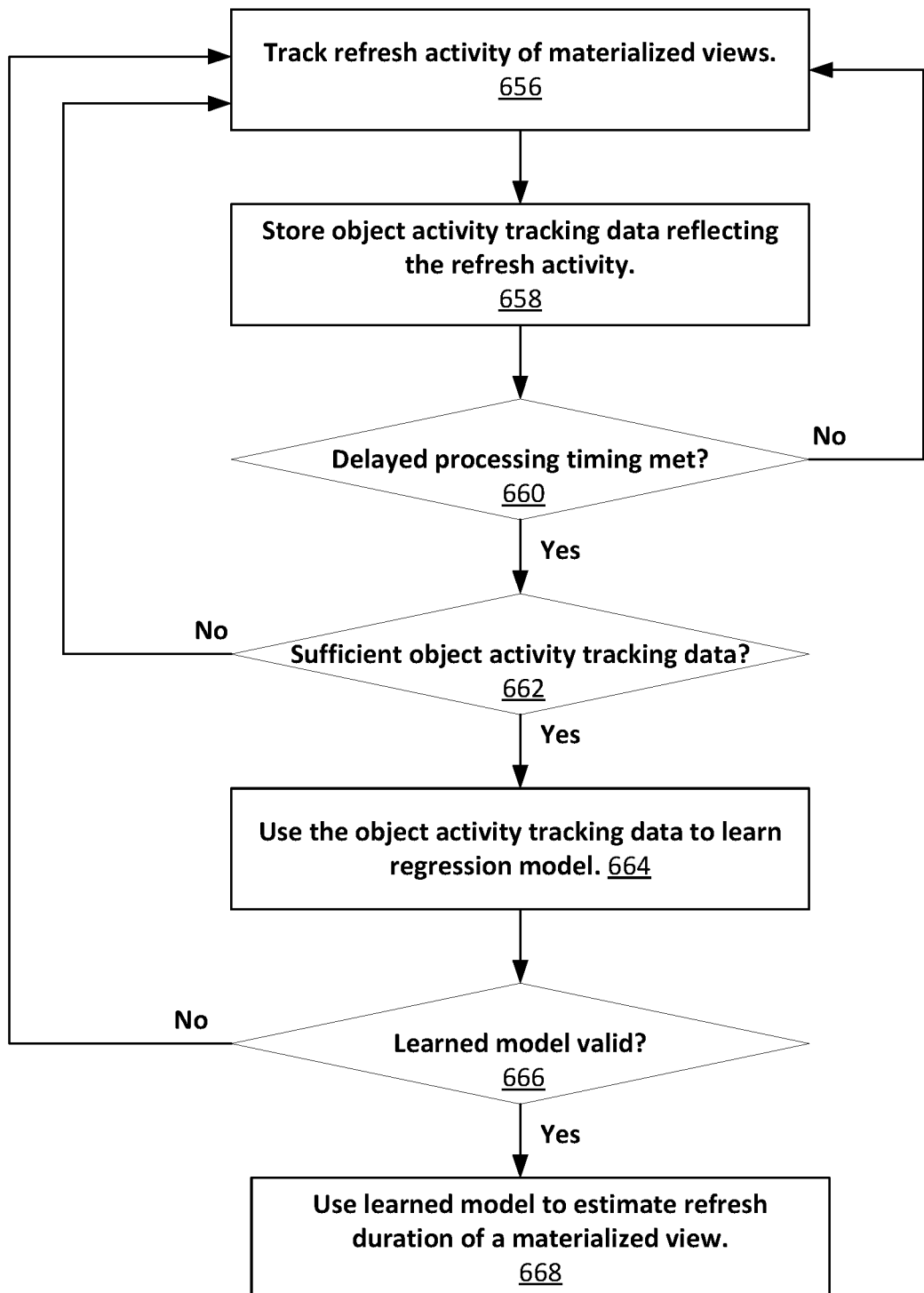
FIG. 6 is a flowchart illustrating the steps of operation of techniques for estimating refresh durations for materialized views.

FIG. 6 comprises a flowchart illustrates the steps of operation of the techniques for estimating refresh durations for materialized views. As described above, the method operates to learn a regression model based on recent refresh activity of the materialized views. If the learned model can be successfully validated, then the learned model is used to estimate how long it will take to refresh a given materialized view. The predictions can be used for a variety of purposes including for determining how to optimally schedule materialized views for refresh.

At step 656, refresh activity of materialized views is tracked continually over time. The refresh activity may include the refresh activity discussed above for each tracked materialized view. At step 658, object activity tracking data reflecting the tracked refresh activity is stored in computer storage media.

At step 660, it is determined whether a delayed processing timing has been met. This determination may be based on the passage of an amount of time (e.g., 24 hours), reaching a certain time (e.g., 2:00 AM), or in response to detecting of an event (e.g., a user input). If the delayed processing timing has not been met, the method continues to track 656 refresh activity of materialized views and store 658 object activity data reflecting the activity over time. Once the delayed processing timing is met, the method proceeds to step 662.

At step 662, it is determined whether there is sufficient object activity tracking data reflecting the recent refresh activity of materialized views to learn the estimate refresh duration regression model. For example, this determination may be based on the number of recent refreshes of materialized views recorded in the object activity tracking data that are available. For example, if there are more than a threshold number (e.g., a half a dozen or so) of refreshes recorded, then it may be determined that there is sufficient object activity data. Otherwise, the method continues to track 656 refresh activity of materialized views and store 658 object activity data reflecting the activity over time. The threshold number may be determined empirically or automatically and based on other factors such as the type of machine learning regression model. For example, if a generalized linear regression model is used, then fewer number of refreshes may be needed to learn a sufficiently accurate model than if a non-linear model is used. In one example implementation, about six historical refreshes is all that is needed to train a sufficiently accurate generalized linear regression model.

At step 664, if there is a sufficient amount of object activity tracking data, then an estimated refresh duration regression model is learned based on the recent object activity tracking data reflecting the recent refresh activity for materialized views.

At step 666, the learned model is validated using the k-fold cross-validation technique. If the learned model is successfully validated, then the learned model is used 668. In particular, the learned regression model is used 668 to predict the estimated refresh durations for given materialized views. If the model cannot be validated, then the method returns to tracking 656 refresh activity of materialized views and storing 658 object activity data reflecting the activity over time.

6. Database Management System Overview

The techniques may be used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g., Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

Generally, data is stored in a database in one or more data containers, each container contains records, and the data within each record is organized into one or more fields. In relational database systems, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g., workstations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

A client may issue a series of requests, such as requests for execution of queries, to a DBMS by establishing a database session. A database session comprises a particular connection established for a client to a database server through which the client may issue the series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables and other information.

A database server includes multiple database processes. Database processes run under the control of the database server (i.e., can be created or terminated by the database server) and perform various database server functions. Database processes include processes running within a database session established for a client.

A database process is a unit of execution. A database process can be an computer system process or thread or a user defined execution context such as a user thread or fiber. Database processes may also include "database server system" processes which provide services and/or perform functions on behalf of entire database server. Such database server system processes include listeners, garbage collectors, log writers, and recovery processes.

A database dictionary may comprise multiple data structures that store database metadata. A database dictionary may for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the column names and datatypes of the columns, and one or more files or portions thereof that store data for the table. Metadata in the database dictionary defining a procedure may specify a name of the procedure, the procedure's arguments and the return datatype and the datatypes of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user defined function implemented in a JAVA class may be defined in part by the database dictionary by specifying the name of the users defined function and by specifying a reference to a file containing the source code of the Java class (i.e., java file) and the compiled version of the class (i.e., class file).

Query optimization generates one or more different candidate execution plans for a query, which are evaluated by the query optimizer to determine which execution plan should be used to compute the query.

Execution plans may be represented by a graph of interlinked nodes, referred to herein as operators or row sources, that each corresponds to a step of an execution plan, referred to herein as an execution plan operation. The hierarchy of the graphs (i.e., directed tree) represents the order in which the execution plan operations are performed and how data flows between each of the execution plan operations. An execution plan operator generates a set of rows (which may be referred to as a table) as output and execution plan operations include, for example, a table scan, an index scan, sort-merge join, nested-loop join, filter, and importantly, a full outer join.

A query optimizer may optimize a query by transforming the query. In general, transforming a query involves rewriting a query into another semantically equivalent query that should produce the same result and that can potentially be executed more efficiently, i.e., one for which a potentially more efficient and less costly execution plan can be generated. Examples of query transformation include view merging, subquery unnesting, predicate move-around and pushdown, common subexpression elimination, outer-to-inner join conversion, materialized view rewrite, and star transformation.

7. Cloud Computing

The techniques may be implemented in a "cloud computing" environment. The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (e.g., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (e.g., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

8. Basic Computing Device

The techniques may be implemented by at least one computing device. If by more than one computing device, the techniques may be implemented in whole or in part using a combination of computing devices that are coupled together using a network, such as a packet data network. A computing device used in an implementation of the techniques may be hard-wired to perform some or all of the techniques, or may include digital electronic devices such as at least one application-specific integrated circuit (ASIC) or field programmable gate array (FPGA) that is persistently programmed to perform some or all of the techniques, or may include at least one general purpose hardware processor programmed to perform some or all of the techniques pursuant to program instructions in firmware, memory, other storage, or a combination. A computing device used in an implementation of the techniques may also combine custom hard-wired logic, ASICs, or FPGAs with custom programming to accomplish some or all of the techniques. A computing device used in an implementation of the techniques may be a server computing device, a workstation computing device, a personal computing device, a portable computing device, a handheld computing device, a mobile computing device or any other computing device that incorporates hard-wired or program logic to implement some or all of the techniques.

Figure 7:
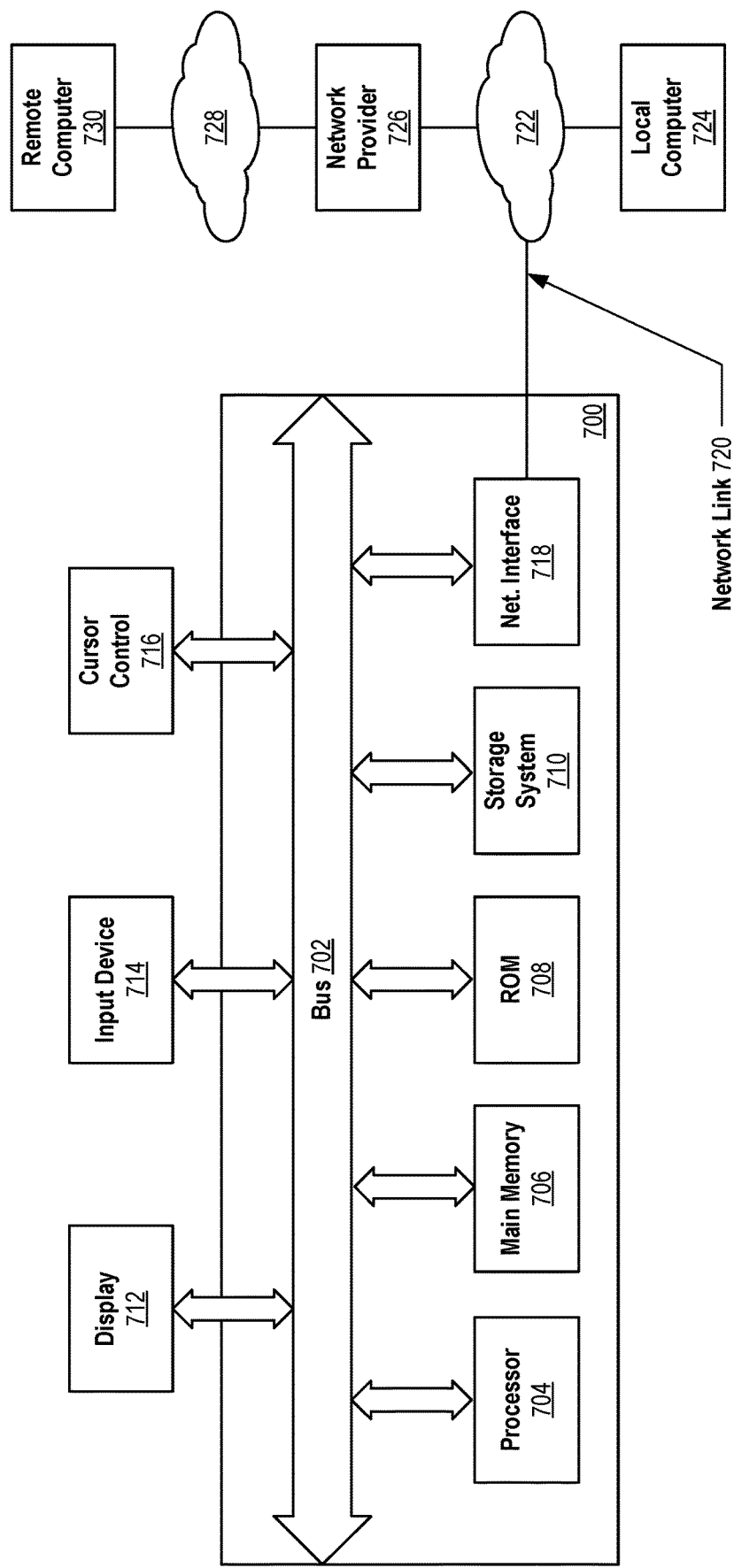
FIG. 7 is a block diagram of an example basic computing device that may be used in an implementation of the techniques.

FIG. 7 is a block diagram of an example basic computing device that may be used in an implementation of the techniques. In the example of FIG. 7, computing device 700 and instructions for implementing some or all of the techniques in hardware, software, or a combination of hardware and software, are represented schematically, for example as boxes and circles, at the same level of detail that is commonly used by persons of ordinary skill in the art to which this disclosure pertains for communicating about computer architecture and computing device implementations.

Computing device 700 includes an input/output (I/O) subsystem 702 which may include a bus or other communication mechanism for communicating information or instructions between the components of the computing device 700 over electronic signal paths. The I/O subsystem 702 may include an I/O controller, a memory controller and at least one I/O port. The electronic signal paths are represented schematically in the drawings, for example as lines, unidirectional arrows or bidirectional arrows.

At least one hardware processor 704 is coupled to I/O subsystem 702 for processing information and instructions. Hardware processor 704 may include, for example, a general-purpose microprocessor or microcontroller or a special-purpose microprocessor such as an embedded system or a graphics processing unit (GPU) or a digital signal processor or ARM processor. Processor 704 may comprise an integrated arithmetic logic unit (ALU) or may be coupled to a separate ALU.

Computing device 700 includes one or more units of memory 706, such as a main memory, which is coupled to I/O subsystem 702 for electronically digitally storing data and instructions to be executed by processor 704. Memory 706 may include volatile memory such as various forms of random-access memory (RAM) or other dynamic storage device. Memory 706 also may be used for storing temporary variables or other intermediate information during execution of instructions to be executed by processor 704. Such instructions, when stored in non-transitory storage media accessible to processor 704, can render computing device 700 into a special-purpose machine that is customized to perform the operations specified in the instructions.

Computing device 700 further includes non-volatile memory such as read only memory (ROM) 708 or other static storage device coupled to I/O subsystem 702 for storing information and instructions for processor 704. The ROM 708 may include various forms of programmable ROM (PROM) such as erasable PROM (EPROM) or electrically erasable PROM (EEPROM). A unit of persistent storage 710 may include various forms of non-volatile RAM (NVRAM), such as FLASH memory, or solid-state storage, magnetic disk or optical disk such as CD-ROM or DVD-ROM, and may be coupled to I/O subsystem 702 for storing information and instructions. Storage 710 is an example of a non-transitory computer-readable medium that may be used to store instructions and data which when executed by the processor 704 cause performing computer-implemented methods to execute some or all of the techniques.

The instructions in memory 706, ROM 708 or storage 710 may comprise one or more sets of instructions that are organized as modules, methods, objects, functions, routines or calls. The instructions may be organized as one or more computer programs, operating system services or application programs including mobile apps. The instructions may comprise an operating system or system software; one or more libraries to support multimedia, programming or other functions; data protocol instructions or stacks to implement TCP/IP, HTTP or other communication protocols; file processing instructions to interpret and render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a database system using structured query language (SQL) or NoSQL, an object store, a graph database, a flat file system or other data storage.

Computing device 700 may be coupled via I/O subsystem 702 to at least one output device 712. Output device 712 may be a digital computer display. Examples of a display that may be used include a touch screen display or a light-emitting diode (LED) display or a liquid crystal display (LCD) or an e-paper display. Computing device 700 may include other types of output devices 712, alternatively or in addition to a display device. Examples of other output devices 712 include printers, ticket printers, plotters, projectors, sound cards or video cards, speakers, buzzers or piezoelectric devices or other audible devices, lamps or LED or LCD indicators, haptic devices, actuators or servos.

An input device 714 may be coupled to I/O subsystem 702 for communicating signals, data, command selections or gestures to processor 704. Examples of input devices 714 include touch screens, microphones, still and video digital cameras, alphanumeric and other keys, keypads, keyboards, graphics tablets, image scanners, joysticks, clocks, switches, buttons, dials, slides, or various types of sensors such as force sensors, motion sensors, heat sensors, accelerometers, gyroscopes, and inertial measurement unit (IMU) sensors or various types of transceivers such as wireless, such as cellular or Wi-Fi, radio frequency (RF) or infrared (IR) transceivers and Global Positioning System (GPS) transceivers.

Another type of input device is a control device 716, which may perform cursor control or other automated control functions such as navigation in a graphical interface on a display screen, alternatively or in addition to input functions. Control device 716 may be a touchpad, a mouse, a trackball, or cursor direction keys for communicating direction information and command selections to processor 704 and for controlling cursor movement on display 712. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 714 may include a combination of multiple different input devices, such as a video camera and a depth sensor.

Computing device 700 may comprise an internet of things (IoT) device or other computing appliance in which one or more of the output device 712, input device 714, and control device 716 are omitted. The input device 714 may comprise one or more cameras, motion detectors, thermometers, microphones, seismic detectors, other sensors or detectors, measurement devices or encoders and the output device 712 may comprise a special-purpose display such as a single-line LED or LCD display, one or more indicators, a display panel, a meter, a valve, a solenoid, an actuator or a servo.

When computing device 700 is a mobile or portable computing device, input device 714 may comprise a global positioning system (GPS) receiver coupled to a GPS module that is capable of triangulating to a plurality of GPS satellites, determining and generating geo-location or position data such as latitude-longitude values for a geophysical location of the computing device 700. Output device 712 may include hardware, software, firmware and interfaces for generating position reporting packets, notifications, pulse or heartbeat signals, or other recurring data transmissions that specify a position of the computing device 700, alone or in combination with other application-specific data, directed toward host 724 or server 730.

Computing device 700 may implement some or all of the techniques using customized hard-wired logic, at least one ASIC or FPGA, firmware or program instructions or logic which when loaded and used or executed in combination with computing device 700 causes or programs computing device 700 to operate as a special-purpose machine.

The techniques performed by computing device 700 may be performed in response to processor 704 executing at least one sequence of at least one instruction contained in main memory 706. Such instructions may be read into main memory 706 from another storage medium, such as storage 710. Execution of the sequences of instructions contained in main memory 706 causes processor 704 to perform some or all of the techniques. Hard-wired circuitry may be used in place of or in combination with software instructions.

The term "storage media" as used herein refers to any non-transitory computer-readable media that store data or instructions that cause a machine to operation in a specific fashion. Such storage media may comprise non-volatile media or volatile media. Non-volatile media includes, for example, optical or magnetic disks, such as storage 710. Volatile media includes dynamic memory, such as memory 706. Common forms of storage media include, for example, a hard disk, solid state drive, flash drive, magnetic data storage medium, any optical or physical data storage medium, memory chip or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 702. Transmission media can also take the form of acoustic or light waves, such as those generated during radio-wave and infra-red data communications.

Various forms of media may be involved in carrying at least one sequence of at least one instruction to processor 704 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computing device 700 can receive the data on the communication link and convert the data to be read by computing device 700. For instance, a receiver such as a radio frequency antenna or an infrared detector can receive the data carried in a wireless or optical signal and appropriate circuitry can provide the data to I/O subsystem 702 such as place the data on a bus. I/O subsystem 702 carries the data to memory 706, from which processor 704 retrieves and executes the instructions. The instructions received by memory 706 may optionally be stored on storage 710 either before or after execution by processor 704.

Computing device 700 also includes a communication interface 718 coupled to bus 702. Communication interface 718 provides a two-way data communication coupling to network link 720 that is directly or indirectly connected to at least one communication networks, such as a network 722 or a public or private cloud on the Internet. For example, communication interface 718 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 722 broadly represents a local area network (LAN), wide-area network (WAN), campus network, internetwork or any combination thereof. Communication interface 718 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic or optical signals over signal paths that carry digital data streams representing various types of information.

Network link 720 typically provides electrical, electromagnetic, or optical data communication directly or through at least one network to other data devices, using, for example, satellite, cellular, Wi-Fi, or BLUETOOTH technology. For example, network link 720 may provide a connection through a network 722 to a host computer 724.

Furthermore, network link 720 may provide a connection through network 722 or to other computing devices via internetworking devices and/or computers that are operated by an Internet Service Provider (ISP) 726. ISP 726 provides data communication services through a world-wide packet data communication network represented as internet 728. A server computer 730 may be coupled to internet 728. Server 730 broadly represents any computer, data center, virtual machine or virtual computing instance with or without a hypervisor, or computer executing a containerized program system such as DOCKER or KUBERNETES. Server 730 may represent an electronic digital service that is implemented using more than one computer or instance and that is accessed and used by transmitting web services requests, uniform resource locator (URL) strings with parameters in HTTP payloads, API calls, app services calls, or other service calls.

Computing device 700 and server 730 may form elements of a distributed computing system that includes other computers, a processing cluster, server farm or other organization of computers that cooperate to perform tasks or execute applications or services. Server 630 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 730 may comprise a web application server that hosts a presentation layer, application layer and data storage layer such as a database system using structured query language (SQL) or NoSQL, an object store, a graph database, a flat file system or other data storage.

Computing device 700 can send messages and receive data and instructions, including program code, through a network, network link 720 and communication interface 718. In the Internet example, server 730 might transmit a requested code for an application program through Internet 728, ISP 726, local network 722 and communication interface 718. The received code may be executed by processor 704 as it is received, or stored in storage 710, or other non-volatile storage for later execution.

9. Basic Software System

Figure 8:
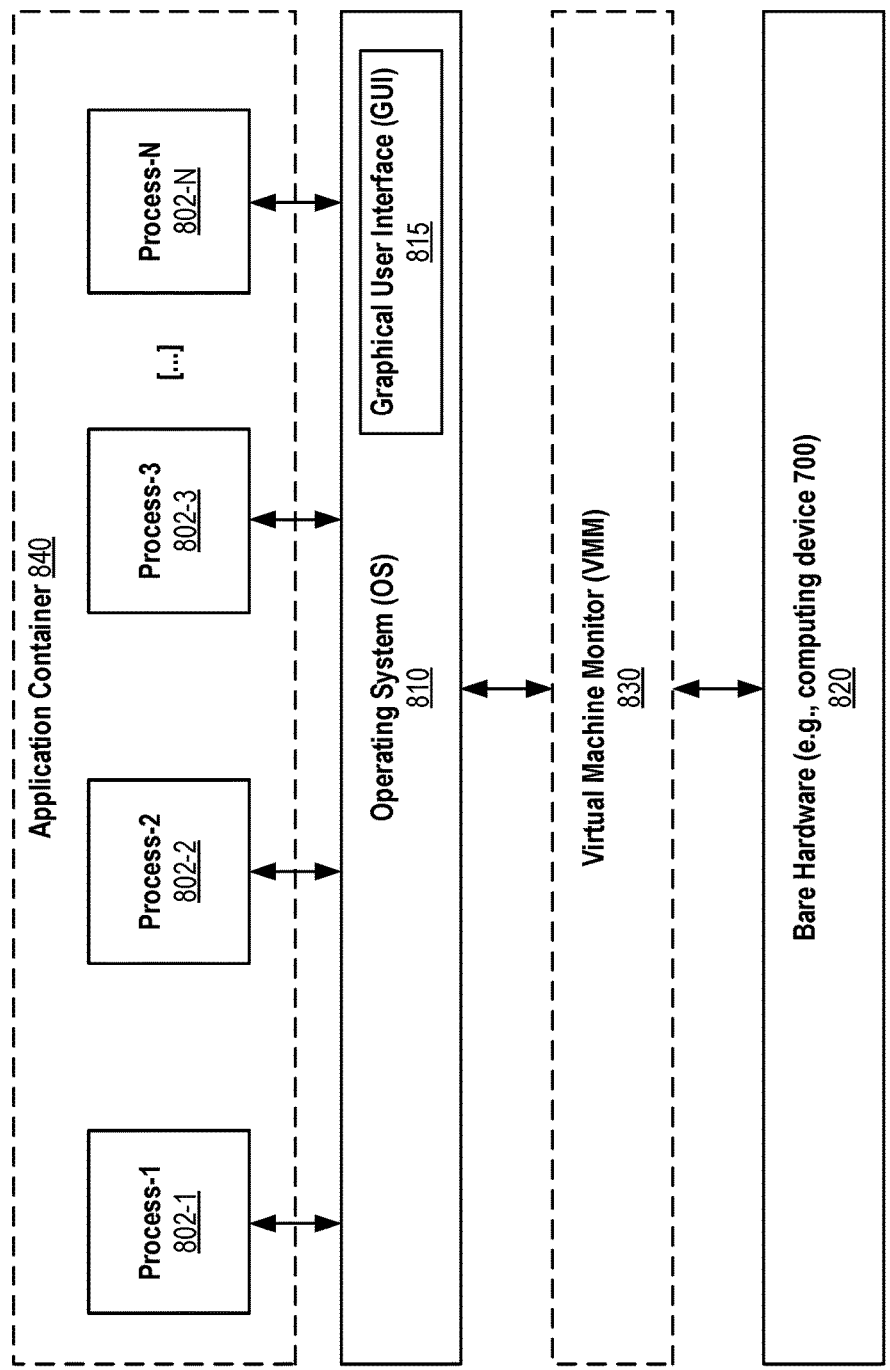
FIG. 8 is a block diagram of an example basic software system that may be employed for controlling the operation of the basic computing device of FIG. 7.

FIG. 8 is a block diagram of an example basic software system 800 that may be employed for controlling the operation of computing device 700 of FIG. 7. Software system 800 and its components, including their connections, relationships, and functions, is meant to be an example only, and not meant to limit implementations of the techniques. Other software systems suitable for implementing the techniques may have different components, including components with different connections, relationships, and functions.

Software system 800 is provided for directing the operation of computer system 700. Software system 800, which may be stored in system memory (RAM) 706 and on fixed storage (e.g., hard disk or flash memory) 710, includes a kernel or operating system (OS) 810.

OS 810 manages low-level aspects of computer operation, including managing execution of processes, represented as 802-1, 802-2, 802-3 . . . 802-N, memory allocation, file input and output (I/O) and device I/O. One or more application programs may be "loaded" (e.g., transferred from fixed storage 710 into memory 706) for execution as one or more processes by the system 800. The applications or other software intended for use on computing device 700 may also be stored as a set of downloadable computer-executable instructions, for example, for downloading and installation from an Internet location (e.g., a Web server, an app store or other online service).

The execution of application program instructions may implement a process (e.g., 802-2) in the form of an instance of a computer program that is being executed and consisting of program code and its current activity. Depending on the operating system (OS), a process (e.g., 802-3) may be made up of multiple threads of execution that execute instructions concurrently. In this context, a computer program is a passive collection of instructions, while a process (e.g., 802-1) may be the actual execution of those instructions. Several processes (e.g., 802-1 and 802-2) may be associated with the same program; for example, opening up several instances of the same program often means more than one process is being executed, or a program that initially launches as a single process may subsequently spawn (e.g., fork) additional processes.

OS 810 may implement multitasking to allow processes 802-1, 802-2, 802-3 . . . 802-N to share processor 704. While each processor 704 or core of the processor executes a single task at a time, computing device 700 may be programmed to implement multitasking to allow each processor to switch between tasks that are being executed without having to wait for each task to finish. Switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. For security and reliability, OS 810 may prevent direct communication between independent processes, providing strictly mediated and controlled inter-process communication functionality.

In some instances, processes 802-1, 802-2, 802-3 . . . 802-N and the application programs they implement may execute within application container 840. Application containers generally are a mode of operation of OS 810 in which OS 810 allows the existence of multiple isolated user space instances to run on OS 810. Application container 840 is an example of one such instance. The instances themselves are sometimes alternatively referred to as zones, virtual private servers, partitions, virtual environments, virtual kernels, or jails. Application containers provide a mechanism whereby finite hardware computing resources such as CPU time and storage media space can be allocated among the instances.

Software system 800 includes a graphical user interface (GUI) 815, for receiving user commands and data in a graphical (e.g., "point-and-click" or "touch gesture") fashion. These inputs, in turn, may be acted upon by system 800 in accordance with instructions from operating system 810 or processes 802-1, 802-2, 802-3 . . . 802-N. GUI 815 also serves to display the results of operation from OS 810 and processes 802-1, 802-2, 802-3 . . . 802-N 802, whereupon the user may supply additional inputs or terminate the session (e.g., log off).

OS 810 can execute directly on bare hardware 820 (e.g., processor 704) of computing device 700. Alternatively, a hypervisor or virtual machine monitor (VMM) 830 may be interposed between bare hardware 820 and OS 810. In this configuration, VMM 830 acts as a software "cushion" or virtualization layer between OS 810 and bare hardware 820 of computing device 700.

VMM 830 instantiates and runs one or more virtual machine instances ("guest machines"). Each guest machine comprises a "guest" operating system, such as OS 810, and one or more applications, such as applications 802, designed to execute on the guest operating system. VMM 830 presents the guest operating systems with a virtual operating platform and manages the execution of the guest operating systems.

In some instances, VMM 830 may allow a guest operating system to run as if it is running on bare hardware 820 of computing device 700 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830. In these instances, the guest operating system is "aware" that it executes on a virtual machine monitor. In other words, VMM 830 may provide para-virtualization to a guest operating system in some instances.

10. Other Aspects of the Disclosure

Unless the context clearly indicates otherwise, the term "or" is used in the foregoing specification and in the appended claims in its inclusive sense (and not in its exclusive sense) so that when used, for example, to connect a list of elements, the term "or" means one, some, or all of the elements in the list.

Unless the context clearly indicates otherwise, the terms "comprising," "including," "having," "based on," "encompassing," and the like, are used in the foregoing specification and in the appended claims in an open-ended fashion, and do not exclude additional elements, features, acts, or operations.

Unless the context clearly indicates otherwise, conjunctive language such as the phrase "at least one of X, Y, and Z," is to be understood to convey that an item, term, etc. may be either X, Y, or Z, or a combination thereof. Thus, such conjunctive language is not intended to require by default implication that at least one of X, at least one of Y and at least one of Z to each be present.

Unless the context clearly indicates otherwise, as used in the foregoing detailed description and in the appended claims, the singular forms "a," "an," and "the" are intended to include the plural forms as well.

Unless the context clearly indicates otherwise, in the foregoing detailed description and in the appended claims, although the terms first, second, etc. are, in some instances, used herein to describe various elements, these elements should not be limited by these terms. These terms are only used to distinguish one element from another. For example, a first computing device could be termed a second computing device, and, similarly, a second computing device could be termed a first computing device. The first computing device and the second computing device are both computing devices, but they are not the same computing device.

In the foregoing specification, the techniques have been described with reference to numerous specific details that may vary from implementation to implementation. The specification and drawings are, accordingly, to be regarded in an illustrative rather than a restrictive sense

The invention claimed is:

1. A method for predicting a future quiet rewrite pattern of a materialized view, the method comprising:
    tracking query rewrite activity for queries that are rewritten to access a materialized view;
    storing object activity tracking data reflecting the query rewrite activity;
    generating, based on the object activity tracking data, a database activity training set that contains a plurality of database activity examples, wherein each database activity example of the plurality of database activity examples contains a corresponding binary label that characterizes a database activity;
    using the plurality of database activity examples to learn a classification model for the materialized view; and
    using the learned classification model to predict whether query rewrite activity for queries rewritten to access the materialized view will occur during a future time interval;
    wherein the method is performed by one or more computing devices.

2. The method of claim 1, further comprising:
    before using the learned classification model to predict whether, during the future time interval, queries will be rewritten to access the materialized view, using a k-fold cross-validation technique to successfully validate the learned classification model.

3. The method of claim 2, wherein k is five.

4. The method of claim 1, wherein the tracked query rewrite activity comprises a number of rewritten user queries executed against the materialized view.

5. The method of claim 1,
    wherein each database activity example of the plurality of database activity examples corresponds to a past time interval;
    wherein the corresponding binary label for each training database activity example of the plurality of database activity examples indicates that, during the past time interval to which the database activity example corresponds, either: (a) a query was rewritten to access the materialized view or (b) no query was rewritten to access the materialized view.

6. The method of claim 1,
    wherein each training database activity example of the plurality of database activity examples corresponds to a past time interval; and
    wherein each database activity example of the plurality of database activity examples comprises one or more of the following features about the past time interval to which the database activity example corresponds:
    a day of week of the past time interval, and
    a week of month of the past time interval.

7. The method of claim 1, further comprising:
    scheduling the materialized view for a refresh based on the prediction of whether query rewrite activity for queries that are rewritten to access the materialized view will occur during the future time interval.

8. The method of claim 7, further comprising:
    using second object activity tracking data reflecting the query rewrite activity to learn a regression model for the materialized view;
    using the learned regression model to predict a number of query rewrites that will use the materialized view during the future time interval; and
    scheduling the materialized view for the refresh based on the prediction of the number of query rewrites that will use the materialized view during the future time interval.

9. The method of claim 7, further comprising:
    tracking change activity on one or more base database objects referenced in the materialized view;
    storing object activity tracking data reflecting the change activity;
    using the object activity tracking data reflecting the change activity to learn a classification model for the materialized view;
    using the learned classification model to predict whether change activity on the one or more base database objects will occur during the future time interval; and
    scheduling the materialized view for the refresh based on the prediction whether change activity on the one or more base database objects will occur during the future time interval.

10. The method of claim 7, further comprising:
    tracking refresh activity of the materialized view;
    storing object activity tracking data reflecting the refresh activity;
    using the object activity tracking data reflecting the refresh activity to learn a regression model for the materialized view;
    using the learned regression model to predict an amount of time needed to refresh the materialized view; and
    scheduling the materialized view for the refresh based on the prediction of the amount of time needed to refresh the materialized view.

11. One or more non-transitory storage media comprising a set of computer-executable instructions capable of:
    tracking query rewrite activity for queries that are rewritten to access a materialized view;
    storing object activity tracking data reflecting the query rewrite activity;
    generating, based on the object activity tracking data, a database activity training set that contains a plurality of database activity examples, wherein each database activity example of the plurality of database activity examples contains a corresponding binary label that characterizes a database activity;
    using the plurality of database activity examples to learn a classification model for the materialized view; and using the learned regression model to predict a number of query rewrites that will use the materialized view during a future time interval; and scheduling the materialized view for a refresh based on the prediction of the number of query rewrites that will use the materialized view during the future time interval.

12. The one or more non-transitory storage media of claim 11, further comprising a set of computer-executable instructions capable of:

before using the learned regression model to predict the number of query rewrites that will use the materialized view during a future time interval, using a k-fold cross-validation technique to successfully validate the learned regression model.

13. The one or more non-transitory storage media of claim 11, wherein the tracked query rewrite activity comprises a number of rewritten user queries executed against the materialized view.

14. The one or more non-transitory storage media of claim 11, wherein each database activity example of the plurality of database activity examples corresponds to a past time interval;

wherein the corresponding binary label for each database activity example of the plurality of database activity examples indicates that, during the past time interval to which the training database activity example corresponds, either: (a) a query was rewritten to access the materialized view or (b) no query was rewritten to access the materialized view.

15. The one or more non-transitory storage media of claim 11, wherein each database activity example of the plurality of database activity examples corresponds to a past time interval; and wherein each database activity example of the plurality of database activity examples comprises one or more of the following features about the past time interval to which the database activity example corresponds:

a day of week of the past time interval, and a week of month of the past time interval.

16. The one or more non-transitory storage media of claim 11, further comprising a set of computer-executable instructions capable of:

using second object activity tracking data reflecting the query rewrite activity to learn a classification model for the materialized view; and using the learned classification model to predict whether query rewrite activity on the materialized view will occur during the future time interval; and scheduling the materialized view for the refresh based on the prediction of whether query rewrite activity on the materialized view will occur during the future time interval.

17. One or more computing devices configured to perform a set of operations comprising:

tracking rewrite activity on a materialized view;

storing object activity tracking data reflecting the rewrite activity;

using the object activity tracking data reflecting the rewrite activity to learn a classification model for the materialized view and to learn a regression model for the materialized view;

using the learned classification model to predict whether rewrite activity on the materialized view will occur during a future time interval;

using the learned regression model to predict a number of query rewrites that will use the materialized view during the future time interval; and scheduling the materialized view for a refresh based on the prediction of whether rewrite activity on the materialized view will occur during the future time interval and based on the prediction of the number of query rewrites that will use the materialized view during the future time interval.

18. The one or more computing devices of claim 17, wherein the set of operations further comprise:

tracking change activity on one or more base database objects referenced in the materialized view;

storing object activity tracking data reflecting the change activity;

using the object activity tracking data reflecting the change activity to learn a second classification model for the materialized view; and using the learned second classification model to predict whether change activity on the one or more base database objects will occur during the future time interval; and scheduling the materialized view for the refresh based on the prediction of whether change activity on the one or more base database objects will occur during the future time interval.

19. The one or more computing devices of claim 18, wherein the set of operations further comprise:

tracking refresh activity of the materialized view;

storing object activity tracking data reflecting the refresh activity;

using the object activity tracking data reflecting the refresh activity to learn a second regression model for the materialized view;

using the learned second regression model to predict a refresh duration of the materialized view; and scheduling the materialized view for the refresh based on the prediction of the refresh duration of the materialized view.

20. The one or more computing devices of claim 18, wherein the learned regression model is a learned feed-forward artificial neural network regression model.

* * * * *

UNITED STATES PATENT AND TRADEMARK OFFICE
CERTIFICATE OF CORRECTION

PATENT NO. : 11,995,081 B2
APPLICATION NO. : 17/127845
DATED : May 28, 2024
INVENTOR(S) : Thiyagarajan et al.

It is certified that error appears in the above-identified patent and that said Letters Patent is hereby corrected as shown below:

In the Specification

In Column 13, Line 30, delete "then" and insert -- than --, therefor.

In Column 21, Line 20, delete "Tan h" and insert -- Tanh --, therefor.

In Column 39, Line 23, delete "sense" and insert -- sense. --, therefor.

In the Claims

In Column 39, Line 61, in Claim 5, after "each" delete "training".

In Column 40, Line 2, in Claim 6, after "each" delete "training".

In Column 41, Line 28, in Claim 14, after "the" delete "training".

Signed and Sealed this
First Day of October, 2024

Katherine Kelly Vidal
*Director of the United States Patent and Trademark Office*